United States Patent
Zhang

(10) Patent No.: US 11,871,123 B2
(45) Date of Patent: Jan. 9, 2024

(54) HIGH DYNAMIC RANGE IMAGE SYNTHESIS METHOD AND ELECTRONIC DEVICE

(71) Applicant: HONOR DEVICE CO., LTD., Shenzhen (CN)

(72) Inventor: Yu Zhang, Shenzhen (CN)

(73) Assignee: HONOR DEVICE CO., LTD., Guangdong (CN)

( * ) Notice: Subject to any disclaimer, the term of this patent is extended or adjusted under 35 U.S.C. 154(b) by 0 days.

(21) Appl. No.: 17/778,195

(22) PCT Filed: Mar. 30, 2021

(86) PCT No.: PCT/CN2021/083986
§ 371 (c)(1),
(2) Date: May 19, 2022

(87) PCT Pub. No.: WO2021/218536
PCT Pub. Date: Nov. 4, 2021

(65) Prior Publication Data
US 2022/0417414 A1   Dec. 29, 2022

(30) Foreign Application Priority Data

Apr. 28, 2020   (CN) .......................... 202010352303.5

(51) Int. Cl.
*H04N 23/741* (2023.01)
(52) U.S. Cl.
CPC ................................ *H04N 23/741* (2023.01)

(58) Field of Classification Search
None
See application file for complete search history.

(56) References Cited

U.S. PATENT DOCUMENTS 9,143,673 B2    9/2015   Miao
10,178,369 B2   1/2019   Yu et al.
2013/0120615 A1 5/2013   Hirooka et al.
(Continued)

FOREIGN PATENT DOCUMENTS

CN   102957871 A   3/2013
CN   104333703 A   2/2015
(Continued)

*Primary Examiner* — James M Hannett
(74) *Attorney, Agent, or Firm* — WOMBLE BOND DICKINSON (US) LLP

(57) ABSTRACT

In the technical solutions of a high dynamic range image synthesis method and an electronic device provided in embodiments of this application, a plurality of images with different depths of field in a current photographing scene are obtained based on an HDR photographing operation entered by a user, and each image has an exposure value. A plurality of images with a same exposure value are synthesized to generate a full depth-of-field image. Full depth-of-field images with a plurality of exposure values are synthesized by using an HDR algorithm to generate a high dynamic range image. Therefore, a high dynamic range image that is clear at each depth of field can be obtained, and a problem that a shallow depth of field leads to a blurred background and an insufficient dynamic range, and then results in overexposure or underexposure of a high dynamic range image can be resolved.

20 Claims, 12 Drawing Sheets

(56) References Cited

U.S. PATENT DOCUMENTS

| | | | |
|---|---|---|---|
| 2013/0335596 A1* | 12/2013 | Demandolx | H04N 23/741 348/E5.029 |
| 2014/0010476 A1 | 1/2014 | Deng | |
| 2017/0289515 A1 | 10/2017 | Li et al. | |
| 2017/0374269 A1 | 12/2017 | Ravi et al. | |
| 2018/0302548 A1* | 10/2018 | Bao | G03B 37/02 |
| 2019/0180137 A1 | 6/2019 | Park | |
| 2019/0222769 A1 | 7/2019 | Srivastava et al. | |
| 2020/0213512 A1* | 7/2020 | Yasutomi | H04N 23/951 |

FOREIGN PATENT DOCUMENTS

| | | | |
|---|---|---|---|
| CN | 104539935 A | 4/2015 | |
| CN | 105282443 A | 1/2016 | |
| CN | 105430266 A | 3/2016 | |
| CN | 105657243 A | 6/2016 | |
| CN | 105791707 A | 7/2016 | |
| CN | 106612392 A | 5/2017 | |
| CN | 108171743 A | 6/2018 | |
| CN | 108419009 A | 8/2018 | |
| CN | 108702437 A | 10/2018 | |
| CN | 109218613 A | 1/2019 | |
| CN | 110139033 A | 8/2019 | |
| CN | 110278375 A | 9/2019 | |
| CN | 110572584 A | 12/2019 | |
| CN | 111526299 A | 8/2020 | |
| JP | 2015231192 A | 12/2015 | |
| JP | 2019036885 A | 3/2019 | |
| WO | 2014047216 A1 | 3/2014 | |
| WO | WO-2020260014 A1 * | 12/2020 | G06F 16/51 |

* cited by examiner

Overexposed photo

Normally exposed photo

Underexposed photo

High dynamic range image

HIGH DYNAMIC RANGE IMAGE SYNTHESIS METHOD AND ELECTRONIC DEVICE

CROSS-REFERENCE TO RELATED APPLICATIONS

This application is a National Stage of International Application No. PCT/CN2021/083986, filed on Mar. 30, 2021, which claims priority to Chinese Patent Application No. 202010352303.5, filed on Apr. 28, 2020. The disclosures of each of the aforementioned applications are hereby incorporated by reference in their entireties.

TECHNICAL FIELD

This application relates to the field of image analysis technologies, and specifically, to a high dynamic range image synthesis method and an electronic device.

BACKGROUND

With popularity of mobile phone photographing, users have increasingly high requirements on a photographing effect. Subsequently, various technologies for improving image quality by using multi-frame image synthesis algorithms emerge, for example, high dynamic range (High-Dynamic Range, HDR for short), multi-frame noise reduction, and multi-frame super-resolution. In a selfie scenario, backlight is usually encountered. To achieve a good photographing effect, an HDR algorithm is usually used in the industry. To be specific, different types of exposure are used to obtain pictures with different luminance, and then a plurality of pictures are synthesized to obtain pictures with moderate luminance. However, in a related HDR algorithm, in a selfie scenario, when a face is in focus and clear, there is a problem that a larger aperture leads to a shallower depth of field. Consequently, a foreground is clear but a background is blurred, and a dynamic range is insufficient, resulting in overexposure or underexposure of a high dynamic range image.

SUMMARY

In view of this, this application provides a high dynamic range image synthesis method and an electronic device, to obtain a high dynamic range image that is clear at each depth of field, and resolve a problem that a shallow depth of field leads to a blurred background and an insufficient dynamic range, and then results in overexposure or underexposure of a high dynamic range image.

According to a first aspect, an embodiment of this application provides a high dynamic range image synthesis method. The method includes:

obtaining, based on an HDR photographing operation entered by a user, a plurality of images with different depths of field in a current photographing scene, where each image has an exposure value;

synthesizing a plurality of images with a same exposure value, to generate a full depth-of-field image; and synthesizing full depth-of-field images with a plurality of exposure values by using an HDR algorithm, to generate a high dynamic range image.

In a possible implementation, the obtaining a plurality of images with different depths of field in a current photographing scene, where each image has an exposure value includes:

obtaining an initial foreground image from a plurality of images of the current photographing scene, and generating at least one foreground depth-of-field image based on the initial foreground image; and obtaining an initial background image from the plurality of images of the current photographing scene, and generating at least one background depth-of-field image based on the initial background image, where each foreground depth-of-field image has an exposure value and each background depth-of-field image has an exposure value.

In a possible implementation, the synthesizing a plurality of images with a same exposure value, to generate a full depth-of-field image includes: generating the full depth-of-field image based on a plurality of foreground depth-of-field images and a plurality of background depth-of-field images that have a same exposure value.

In a possible implementation, the synthesizing full depth-of-field images with a plurality of exposure values by using an HDR algorithm, to generate a high dynamic range image includes:

calculating a synthesis weight of each pixel in the foreground depth-of-field image with the exposure value based on a pixel value corresponding to each pixel in the foreground depth-of-field image;

calculating a synthesis weight of each pixel in the background depth-of-field image with the exposure value based on a pixel value corresponding to each pixel in the background depth-of-field image; and synthesizing obtained foreground depth-of-field images and background depth-of-field images with the plurality of exposure values based on a synthesis weight of each pixel in the foreground depth-of-field images with the plurality of exposure values and a synthesis weight of each pixel in the background depth-of-field images with the plurality of exposure values, to generate the high dynamic range image.

In a possible implementation, the generating at least one foreground depth-of-field image based on the initial foreground image includes:

recognizing a quantity of objects from the initial foreground image;

when the quantity of objects is greater than 1, determining first object depths of field corresponding to the plurality of objects;

performing focusing on a plurality of objects with different first object depths of field, to obtain a plurality of first object focusing regions; and generating a plurality of foreground depth-of-field images based on the initial foreground image, the plurality of first object focusing regions, a plurality of first object depths of field, and corresponding exposure values.

In a possible implementation, the method further includes:

when the quantity of objects is equal to 1, determining a second object depth of field corresponding to the object;

performing focusing on the object with the second object depth of field, to obtain a second object focusing region; and generating one foreground depth-of-field image based on the initial foreground image, the second object focusing region, the second object depth of field, and a corresponding exposure value.

In a possible implementation, before the generating a plurality of foreground depth-of-field images based on the initial foreground image, the plurality of first object focusing regions, and a plurality of first object depths of field, the method further includes:
- detecting whether contrast between the plurality of first object focusing regions is greater than a preset contrast value; and
- if it is detected that the contrast between the plurality of first object focusing regions is greater than the preset contrast value, continuing to perform the step of performing focusing on a plurality of objects with different first object depths of field to obtain a plurality of first object focusing regions.

In a possible implementation, the object includes a face or a physical body.

In a possible implementation, the generating at least one background depth-of-field image based on the initial background image includes:
- determining at least one background depth of field from the initial background image based on a preset depth-of-field range, where the background depth of field is greater than the first object depth of field or the second object depth of field;
- performing focusing on the at least one background depth of field, to obtain at least one background focusing region; and
- generating the at least one background depth-of-field image based on the initial background image, the at least one background focusing region, the at least one background depth of field, and a corresponding exposure value.

According to a second aspect, an embodiment of this application provides an electronic device, including:
- a processing unit, configured to obtain, based on an HDR photographing operation entered by a user, a plurality of images with different depths of field in a current photographing scene, where each image has an exposure value.

The processing unit is further configured to synthesize a plurality of images with a same exposure value, to generate a full depth-of-field image.

The processing unit is further configured to synthesize full depth-of-field images with a plurality of exposure values by using an HDR algorithm, to generate a high dynamic range image.

In a possible implementation, the obtaining a plurality of images with different depths of field in a current photographing scene, where each image has an exposure value includes:
- the processing unit is further configured to obtain an initial foreground image from a plurality of images of the current photographing scene, and generating at least one foreground depth-of-field image based on the initial foreground image; and
- the processing unit is further configured to obtain an initial background image from the plurality of images of the current photographing scene, and generating at least one background depth-of-field image based on the initial background image, where each foreground depth-of-field image has an exposure value and each background depth-of-field image has an exposure value. In a possible implementation, the synthesizing a plurality of images with a same exposure value, to generate a full depth-of-field image includes: the processing unit is further configured to generate the full depth-of-field image based on a plurality of foreground depth-of-field images and a plurality of background depth-of-field images that have a same exposure value.

In a possible implementation, the synthesizing full depth-of-field images with a plurality of exposure values by using an HDR algorithm, to generate a high dynamic range image includes:
- the processing unit is further configured to calculate a synthesis weight of each pixel in the foreground depth-of-field image with the exposure value based on a pixel value corresponding to each pixel in the foreground depth-of-field image;
- the processing unit is further configured to calculate a synthesis weight of each pixel in the background depth-of-field image with the exposure value based on a pixel value corresponding to each pixel in the background depth-of-field image; and
- the processing unit is further configured to synthesize obtained foreground depth-of-field images and background depth-of-field images with the plurality of exposure values based on a synthesis weight of each pixel in the foreground depth-of-field images with the plurality of exposure values and a synthesis weight of each pixel in the background depth-of-field images with the plurality of exposure values, to generate the high dynamic range image.

In a possible implementation, the generating at least one foreground depth-of-field image based on the initial foreground image includes:
- a detection unit, configured to recognize a quantity of objects from the initial foreground image.

The processing unit is further configured to: when the quantity of objects is greater than 1, determine first object depths of field corresponding to the plurality of objects.

The processing unit is further configured to perform focusing on a plurality of objects with different first object depths of field, to obtain a plurality of first object focusing regions. The processing unit is further configured to generate a plurality of foreground depth-of-field images based on the initial foreground image, the plurality of first object focusing regions, a plurality of first object depths of field, and corresponding exposure values.

In a Possible Implementation,
- the processing unit is further configured to: when the quantity of objects is equal to 1, determine a second object depth of field corresponding to the object;
- the processing unit is further configured to perform focusing on the object with the second object depth of field, to obtain a second object focusing region; and
- the processing unit is further configured to generate one foreground depth-of-field image based on the initial foreground image, the second object focusing region, the second object depth of field, and a corresponding exposure value.

In a possible implementation, before the generating a plurality of foreground depth-of-field images based on the initial foreground image, the plurality of first object focusing regions, and a plurality of first object depths of field, the method further includes:
- the detection unit is further configured to detect whether contrast between the plurality of first object focusing regions is greater than a preset contrast value; and if it is detected that the contrast between the plurality of first object focusing regions is greater than the preset contrast value, continue to perform the step of performing focusing on a plurality of objects with different first object depths of field to obtain a plurality of first object focusing regions.

In a possible implementation, the object includes a face or a physical body.

In a possible implementation, the generating at least one background depth-of-field image based on the initial background image includes:

the processing unit is further configured to determine at least one background depth of field from the initial background image based on a preset depth-of-field range, where the background depth of field is greater than the first object depth of field or the second object depth of field;

the processing unit is further configured to perform focusing on the at least one background depth of field, to obtain at least one background focusing region; and the processing unit is further configured to generate the at least one background depth-of-field image based on the initial background image, the at least one background focusing region, the at least one background depth of field, and a corresponding exposure value.

According to a third aspect, an embodiment of this application provides an electronic device, including a display, a camera, one or more processors, a memory, a plurality of application programs, and one or more computer programs. The one or more computer programs are stored in the memory, the one or more computer programs include instructions, and when the instructions are executed by the device, the device is enabled to perform the high dynamic range image synthesis method in any one of the possible implementations of any one of the foregoing aspects.

According to a fourth aspect, an embodiment of this application provides a high dynamic range image synthesis apparatus. The apparatus performs the high dynamic range image synthesis method according to any implementation in the first aspect.

According to a fifth aspect, an embodiment of this application provides a computer-readable storage medium. The computer medium stores program code to be executed by a device, and the program code includes instructions used to perform the method in any one of the first aspect or the possible implementations of the first aspect.

In the technical solutions provided in embodiments of this application, a plurality of images with different depths of field in a current photographing scene are obtained based on an HDR photographing operation entered by a user, and each image has an exposure value. A plurality of images with a same exposure value are synthesized to generate a full depth-of-field image. Full depth-of-field images with a plurality of exposure values are synthesized by using an HDR algorithm to generate a high dynamic range image. Therefore, a high dynamic range image that is clear at each depth of field can be obtained, and a problem that a shallow depth of field leads to a blurred background and an insufficient dynamic range, and then results in overexposure or underexposure of a high dynamic range image can be resolved.

DESCRIPTION OF EMBODIMENTS

Figure 1:
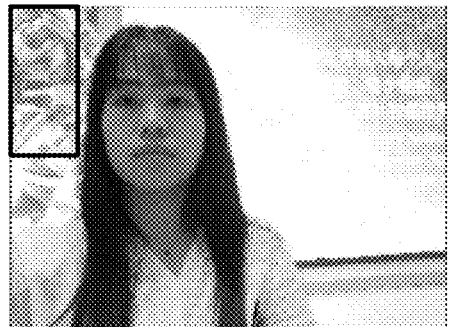
FIG. 1 is a schematic diagram of image synthesis based on an HDR algorithm in a related technology.
Figure 1:
Figure 1:
Figure 1:
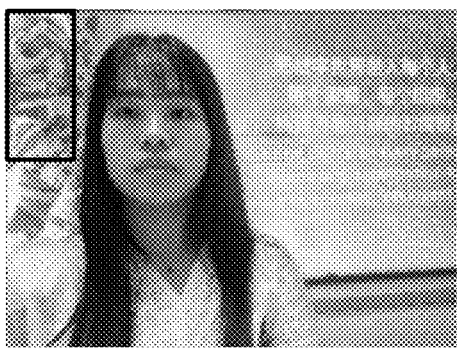

To better understand the technical solutions of this application, the following describes embodiments of this application in detail with reference to the accompanying drawings.

It should be noted that the described embodiments are merely some but not all of embodiments of this application. Based on embodiments of this application, all other embodiments obtained by a person of ordinary skill in the art without creative efforts fall within the protection scope of this application.

Terms used in embodiments of this application are merely for the purpose of describing specific embodiments, but are not intended to limit this application. Terms "a", "the", and "this" in singular forms in embodiments of this application and the appended claims are also intended to include plural forms, unless otherwise stated in the context clearly.

It should be understood that the term "and/or" used in this specification is merely an association relationship for describing associated objects, and indicates that there may be three relationships. For example, A and/or B may indicate the following three cases: Only A exists, both A and B exist, and only B exists. In addition, the character "/" in this specification usually indicates an "or" relationship between the associated objects.

A high dynamic range image synthesis method provided in embodiments of this application can be applied to a photographing scenario of performing photographing by using an electronic device. The following briefly describes the photographing scenario of performing photographing by using an electronic device.

There are the following photographing scenarios of performing photographing by using an electronic device.

Scenario 1 is a photographing scenario of performing photographing by using an electronic device with a single camera. A photographing application such as Camera is opened in the electronic device with the single camera. A user holds the electronic device and taps a photographing button, to perform photographing by using the single camera. Alternatively, the user uses an external force such as a photographing rod to support the electronic device, and taps a photographing button on the photographing rod, to perform photographing by using the single camera. It should be noted that the single camera may include a front-facing camera or a rear-facing camera, and the photographing scenario may include a selfie scenario or a scenario of photographing by another person.

Scenario 2 is a photographing scenario of performing photographing by using an electronic device with a plurality of cameras. A photographing application such as Camera is opened in the electronic device with the plurality of cameras. A camera working mode is adjusted to a multi-camera working mode. A user taps a photographing button, to perform photographing by using the plurality of cameras. It should be noted that the plurality of cameras may include a front-facing camera or a rear-facing camera. It should be noted that, for the photographing scenario of performing photographing by using an electronic device with a plurality of cameras, each camera can simultaneously obtain a plurality of images that have different depths of field and different exposure frames in the current photographing scene, and full depth-of-field images with a plurality of exposure values are synthesized by using an HDR algorithm to generate a high dynamic range image. Compared with the photographing scenario of performing photographing by using an electronic device with a single camera, using a plurality of cameras for photographing can reduce photographing workload of a single camera, thereby improving synthesis efficiency of a high dynamic range image. For example, when nine images need to be shot for synthesis, in a single-camera working mode, a single camera needs to shoot nine images, but in a multi-camera working mode, a plurality of cameras need to shoot nine images, so that a quantity of images to be shot by each camera is reduced. Therefore, using a plurality of cameras for photographing can reduce photographing workload of a single camera, thereby improving synthesis efficiency of a high dynamic range image.

A high dynamic range image synthesis technical solution provided in embodiments of this application is used in the foregoing photographing scenario. A plurality of images with different depths of field in the current photographing scene are obtained based on an HDR photographing operation entered by a user, and each image has an exposure value. A plurality of images with a same exposure value are synthesized to generate a full depth-of-field image. Full depth-of-field images with a plurality of exposure values are synthesized by using an HDR algorithm to generate a high dynamic range image. Therefore, compared with an HDR image synthesis solution in a related technology, the high dynamic range image synthesis technical solution in embodiments of this application can be used to obtain a high dynamic range image that is clear at each depth of field, and resolve a problem that a shallow depth of field leads to a blurred background and an insufficient dynamic range, and then results in overexposure or underexposure of a high dynamic range image.

Embodiments of this application relate to HDR and depth of field application. For ease of understanding, the following first describes related terms and related concepts such as HDR and depth of field that may be used in embodiments of this application.

(1) HDR

A high dynamic range (High Dynamic Range, HDR for short) image is a high dynamic range photo obtained by synthesizing a plurality of consecutive images with different exposure. To be specific, low dynamic range (Low Dynamic Range, LDR for short) images at different exposure times and an LDR image corresponding to optimal details at each exposure time are synthesized into a final HDR image. Therefore, compared with a common image, a high dynamic range image can provide more dynamic ranges and image details, so that a visual effect in a real environment can be better reflected.

(2) Depth of Field, Foreground Depth of Field, and Background Depth of Field

A depth of field (Depth of Field, DOF for short) refers to front and back distance ranges of a photographed object measured through imaging that can obtain a clear image on a camera or another imager. To be specific, the depth of field is clear ranges formed in front of a focus point and behind the focus point. The focus point includes a clearest point obtained when light is focused on a photosensitive element through a lens. The foreground depth of field includes the clear range in front of the focus point, and the background depth of field includes the clear range behind the focus point.

Main factors that influence the depth of field may include an aperture, a lens, and a distance of a photographed object. A larger aperture (a smaller aperture value f) indicates a shallower depth of field, and a smaller aperture (a larger aperture value f) indicates a deeper depth of field. A longer lens focal length indicates a shallower depth of field, and a shorter lens focal length indicates a deeper depth of field. Influencing factors of the depth of field, the foreground depth of field, and the background depth of field may be described according to the following formulas.

> Foreground depth of field=(aperture*circle of confusion coefficient*square of focusing distance)/(square of lens focal length+aperture*circle of confusion coefficient*focusing distance), where the circle of confusion coefficient is related to a size of a used photosensitive element.

> Background depth of field=(aperture*circle of confusion coefficient*square of focusing distance)/(square of lens focal length−aperture*circle of confusion coefficient*focusing distance).

> Depth of field=foreground depth of field+background depth of field.

(3) Auto Focus

Auto focus (Auto Focus, AF for short) is a manner in which light reflected by an object is accepted by a charge coupled device (Charge Coupled Device, CCD for short) on a camera by using a light reflection principle of the object, and is processed by a computer, to drive an electric focusing apparatus to perform focusing on the object.

(4) Aperture

An aperture is an apparatus configured to control an amount of light transmitted through a lens onto a photosensitive surface in a body, that is, the aperture can control an amount of light entering the lens. Usually, an aperture value F is used to represent an aperture size. To be specific, a smaller aperture value F indicates a larger aperture, and a larger aperture value F indicates a smaller aperture.

(5) Exposure Value

An exposure value (Exposure Value, EV for short) is a value that represents a light transmission capability of a photographic lens based on a combination of a shutter speed value and an aperture value. A lower shutter speed and a larger aperture indicate a longer light transmission time and a larger light transmission area, that is, a larger exposure value. For example, an EV value of an aperture f/2.8 and a shutter 1/15 second is larger than an EV value of an aperture f/8 and a shutter 1/60 second.

(6) Automatic Exposure

Automatic exposure (Automatic Exposure, AE for short) mainly includes three types: full-automatic program exposure, aperture priority exposure, and shutter priority exposure. In the program automatic exposure, a camera can automatically set a shutter speed and an aperture value based on an exposure value of a shot picture measured by a photometric system and a shutter and aperture exposure combination specified by the manufacturer during production.

Automatic exposure refers to an exposure manner in which a camera automatically adjusts an exposure amount based on light intensity. In the automatic exposure manner, a problem of low quality of a shot photo caused due to overexposure or underexposure can be resolved.

(7) Backlight

Backlight is a condition in which a photographed subject is just located between a light source and a camera. In this condition, the photographed subject is likely to be underexposed. Therefore, in a general case, a photographer should avoid photographing an object in a backlight condition as much as possible.

(8) Image Registration

Image registration (Image registration) is a process of performing matching and superimposition on two or more images obtained at different times, by different sensors (imaging devices), or under different conditions (such as weather, luminance, photographing positions, and angles).

An HDR algorithm is a multi-image synthesis algorithm. A camera obtains a plurality of shot images in a continuous multi-frame manner using different exposure. Because there is a time difference of tens of milliseconds between every two shot images, there is a difference between the two shot images. Therefore, in the HDR algorithm, during multi-image synthesis, image registration needs to be performed on two or more shot images, to correct a difference between the shot images.

FIG. 1 is a schematic diagram of image synthesis based on an HDR algorithm in a related technology. A selfie scenario is used as an example. FIG. 1 shows an "overexposed photo", a "normally exposed photo", an "underexposed photo", and a "high dynamic range image" obtained by synthesizing the three images. The three images: the "overexposed photo", the "normally exposed photo", and the "underexposed photo", are three images obtained by a camera in a continuous multi-frame photographing manner using different exposure. An image processing unit calculates, based on a pixel value corresponding to each pixel in the three obtained images, a synthesis weight corresponding to each pixel in the three images, and synthesizes the three images based on the synthesis weight corresponding to each pixel in the three images, to generate a "high dynamic range image".

For example, as shown in FIG. 1, the image processing unit calculates, based on a pixel value corresponding to each pixel in display regions corresponding to black-line boxes in the "overexposed photo", the "normally exposed photo", and the "underexposed photo", a synthesis weight corresponding to each pixel in the display regions corresponding to the black-line boxes in the three images, and synthesizes, based on the synthesis weight corresponding to each pixel in the display regions corresponding to the black-line boxes in the three images, the display regions corresponding to the black-line boxes in the three images, to generate a display region corresponding to a black-line box in the "high dynamic range image". It can be learned from the display region corresponding to the black-line box in the "high dynamic range image" that the display region has moderate luminance compared with the display regions corresponding to the black-line boxes in the "overexposed photo", the "normally exposed photo", and the "underexposed photo".

In a related technology, an HDR algorithm in a photographing scenario of performing photographing by using an electronic device is shown in the following Table 1.

TABLE 1

| HDR algorithm in a photographing scenario in a related technology | | | | | |
|---|---|---|---|---|---|
| | Step 11 | Step 12 | Step 13 | Step 14 | Synthesis result |
| HDR | Exp0 Exp1 Exp2 | Image registration | Weight calculation | Synthesis | HDR image |

In Table 1, step 11 includes: obtaining three images shot by a camera by photographing a same photographed object in a continuous multi-frame photographing manner, where each of the three images has a different exposure value. For example, an exposure value of the first image is Exp0, an exposure value of the second image is Exp1, and an exposure value of the third image is Exp2.

Step 12 includes a process of performing matching and superimposition on the three obtained images. Specifically, step 12 includes: correcting a difference between the three shot images. If it is determined that the difference between the three images is greater than a preset value, synthesis in a subsequent step cannot be performed. The difference between the images may include a position deviation between the images.

Step 13 includes: calculating, based on a pixel value of each pixel in each obtained image, a synthesis weight corresponding to each pixel in each image.

Step 14 includes: synthesizing the three obtained images based on the synthesis weight corresponding to each pixel in the three images, to generate a high dynamic range image.

Figure 2:
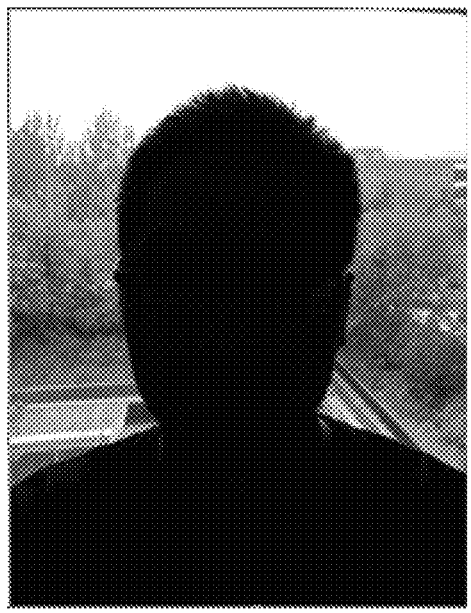
FIG. 2 is a schematic diagram of obtaining a face image through matting in a related technology.

In addition, in a process of generating a high dynamic range image through synthesis in a related technology, because a shot image may include a face image and a background image, the face image and the background image need to be separated. As shown in FIG. 2, an image processing unit separates a face image from a shot image through matting by using an image segmentation algorithm to obtain a background image; calculates a synthesis weight of each pixel in the background image according to step 13; and generates an HDR image based on the face image obtained through matting, the background image, and the synthesis weight of each pixel in the background image. An exposure value of the face image obtained through matting is Exp0. In other words, a synthesis weight corresponding to each pixel in the face image obtained through matting does not need to be calculated. This synthesis manner is used because a face protection policy is set in an HDR algorithm in a related technology, and the face protection policy includes determining basic luminance of an entire image based on face luminance. In addition, in a general case, the face image whose exposure value is Exp0 has moderate luminance and is clear.

However, there are the following defects in obtaining a high dynamic range image through synthesis in a related technology.

Figure 3:
FIG. 3 is a schematic diagram of a shot image in a related technology.

Defect 1: In a selfie scenario, when a face is in focus and clear, a background is blurred, that is, a depth of field of a camera is shallow. For example, FIG. 3 shows a selfie image shot by a camera with an f2.0 aperture. In FIG. 3, a face 1 at a 40-cm depth of field is clear, and a face 2 at a 150-cm depth of field is blurred.

As shown in FIG. 3, in the selfie image, a foreground includes the face 1, and a background includes the face 2, a computer, and the like. In addition, the foreground of the selfie image is clear, and the background of the selfie image is blurred. A reason for this problem is that because electronic devices held by users are different, and photographing distances are different, formed foreground depths and background depths are different. For example, a selfie camera A is used as an example, and a depth of field table of the selfie camera A is shown in the following Table 2.

TABLE 2

Depth of field table of the selfie camera A

| Photographing distance (cm) | Foreground depth of field | Background depth of field | Total depth of field |
| --- | --- | --- | --- |
| 40 | 10 | 21 | 31 |
| 50 | 12 | 48 | 60 |
| 60 | 15 | 90 | 105 |
| 70 | 21 | 168 | 189 |
| 80 | 27 | 270 | 297 |
| 90 | 35 | 420 | 455 |
| 100 | 45 | 651 | 696 |

For example, it may be learned from the foregoing Table 2 that when a photographing distance is 40 cm, an image in a depth-of-field range between a foreground depth of field and a background depth of field is clear, that is, an image shot within a total depth of field of 31 cm is clear, but an image shot outside the total depth of field of 31 cm is blurred.

Defect 2: A larger aperture leads to a shallower depth of field.

In a related technology, to obtain a larger amount of incoming light, a larger aperture is usually used by a camera. However, in a selfie scenario, a photographing distance is limited. For example, the photographing distance is usually about 40 cm. A short photographing distance leads to a small amount of incoming light, and consequently, a background cannot be very clear. For example, an electronic device 110 uses an F2.2 small aperture, and a depth of field is good. However, because an amount of incoming light is small, quality of an image shot at a low luminance is relatively poor.

For the defects in the foregoing related technology, an embodiment of this application provides an electronic device, to resolve the defects in the foregoing related technology.

Figure 4:
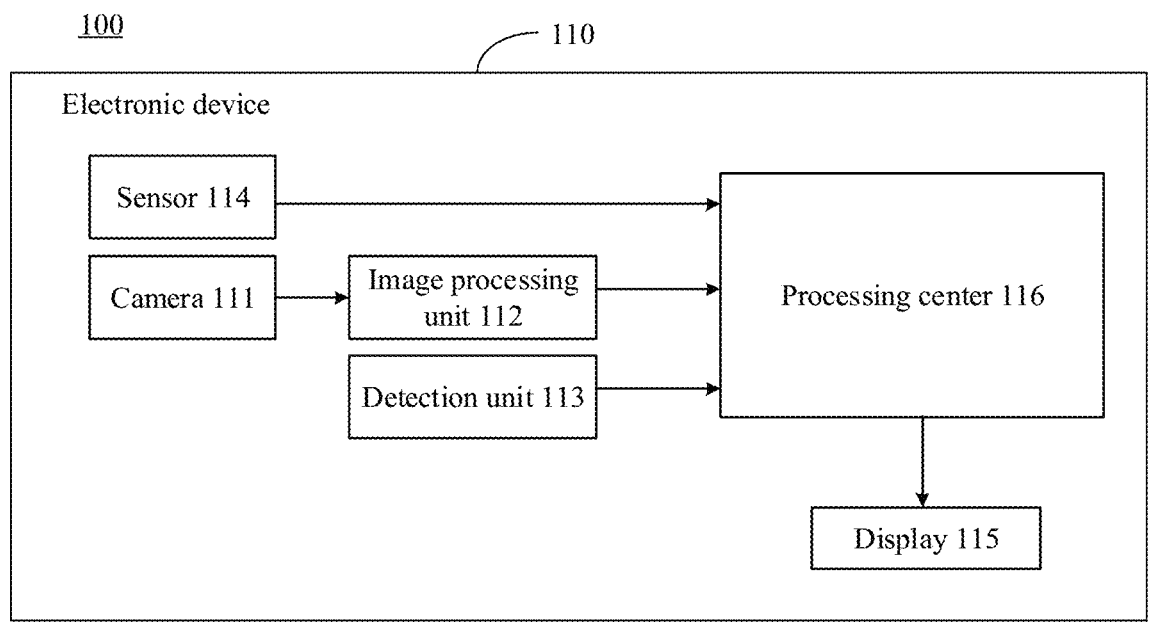
FIG. 4 is a diagram of a system structure of an electronic device according to an embodiment of this application.

FIG. 4 is a diagram of a system structure of an electronic device according to an embodiment of this application. As shown in FIG. 4, the electronic device 110 may include a camera 111, an image processing unit 112, a detection unit 113, a sensor 114, a display 115, and a processing center 116.

The camera 111 may include a single camera or a plurality of cameras, configured to obtain, based on an HDR photographing operation entered by a user, a plurality of images with different depths of field in a current photographing scene, where each image has an exposure value. It should be noted that exposure values of the images may be the same or different.

The image processing unit 112 is configured to: synthesize a plurality of images with a same exposure value, to generate a full depth-of-field image; and synthesize full depth-of-field images with a plurality of exposure values by using an HDR algorithm, to generate a high dynamic range image.

The camera 111 is specifically configured to obtain an initial foreground image and an initial background image from the plurality of images of the current photographing scene based on the HDR photographing operation entered by the user, where the initial foreground image is used to indicate an image in which a foreground is used as a photographed object, and the initial background image is used to indicate an image in which a background is used as a photographed object.

The image processing unit 112 is specifically configured to generate at least one foreground depth-of-field image based on the initial foreground image, and generate at least one background depth-of-field image based on the initial background image, where each foreground depth-of-field image has an exposure value and each background depth-of-field image has an exposure value.

The image processing unit 112 is specifically configured to generate the full depth-of-field image based on a plurality of foreground depth-of-field images and a plurality of background depth-of-field images that have a same exposure value.

The image processing unit 112 is specifically configured to: calculate a synthesis weight of each pixel in the foreground depth-of-field image with the exposure value based on a pixel value corresponding to each pixel in the foreground depth-of-field image; calculate a synthesis weight of each pixel in the background depth-of-field image with the exposure value based on a pixel value corresponding to each pixel in the background depth-of-field image; and synthesize obtained foreground depth-of-field images and background depth-of-field images with the plurality of exposure values based on a synthesis weight of each pixel in the foreground depth-of-field images with the plurality of exposure values and a synthesis weight of each pixel in the background depth-of-field images with the plurality of exposure values, to generate the high dynamic range image.

The detection unit 113 is configured to recognize a quantity of objects from the initial foreground image.

The image processing unit 112 is further configured to: when the quantity of objects is greater than 1, determine first object depths of field corresponding to the plurality of objects; or when the quantity of objects is equal to 1, determining a second object depth of field corresponding to the object.

The sensor 114 is configured to: perform focusing on a plurality of objects with different first object depths of field, to obtain a plurality of first object focusing regions; or perform focusing on the object with the second object depth of field, to obtain a second object focusing region.

The image processing unit 112 is further configured to: generate a plurality of foreground depth-of-field images based on the initial foreground image, the plurality of first object focusing regions, the plurality of first object depths of field, and corresponding exposure values; or generate one foreground depth-of-field image based on the initial foreground image, the second object focusing region, the second object depth of field, and a corresponding exposure value.

The detection unit 113 is further configured to detect whether contrast between the plurality of first object focusing regions is greater than a preset contrast value.

The image processing unit 112 is further configured to: determine at least one background depth of field from the initial background image based on a preset depth-of-field range, where the background depth of field is greater than the first object depth of field or the second object depth of field; perform focusing on the at least one background depth of field, to obtain at least one background focusing region; and generate the at least one background depth-of-field image based on the initial background image, the at least one background focusing region, the at least one background depth of field, and a corresponding exposure value.

The display 115 is configured to display the generated high dynamic range image.

The processing center 116 is configured to receive information that is output by the camera 111, the image processing unit 112, the detection unit 113, and the sensor 114. The processing center 116 is further configured to output information about the high dynamic range image to the display 115, so that the display 115 can display the generated high dynamic range image.

Figure 5:
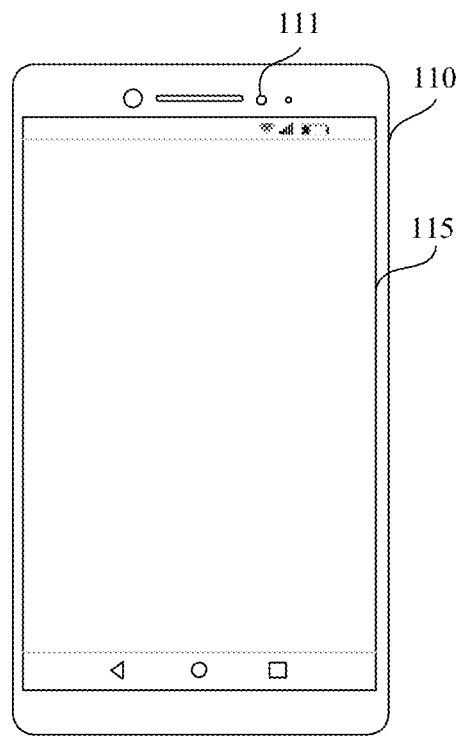
FIG. 5 is a schematic diagram of a structure of an electronic device according to an embodiment of this application.

FIG. 5 is a schematic diagram of a structure of an electronic device according to an embodiment of this application. As shown in FIG. 5, the electronic device 110 includes a camera 111 and a display 115. The camera 111 may include a single camera or a plurality of cameras, configured to shoot a plurality of images. The display 115 is configured to display a plurality of types of varying digits, texts, graphic images, and the like.

In this embodiment of this application, the camera 111 may include a single camera or a plurality of cameras, configured to obtain, based on an HDR photographing operation entered by a user, a plurality of images with different depths of field in a current photographing scene, where each image has an exposure value. The display 115 is configured to display a generated high dynamic range image.

Figure 6:
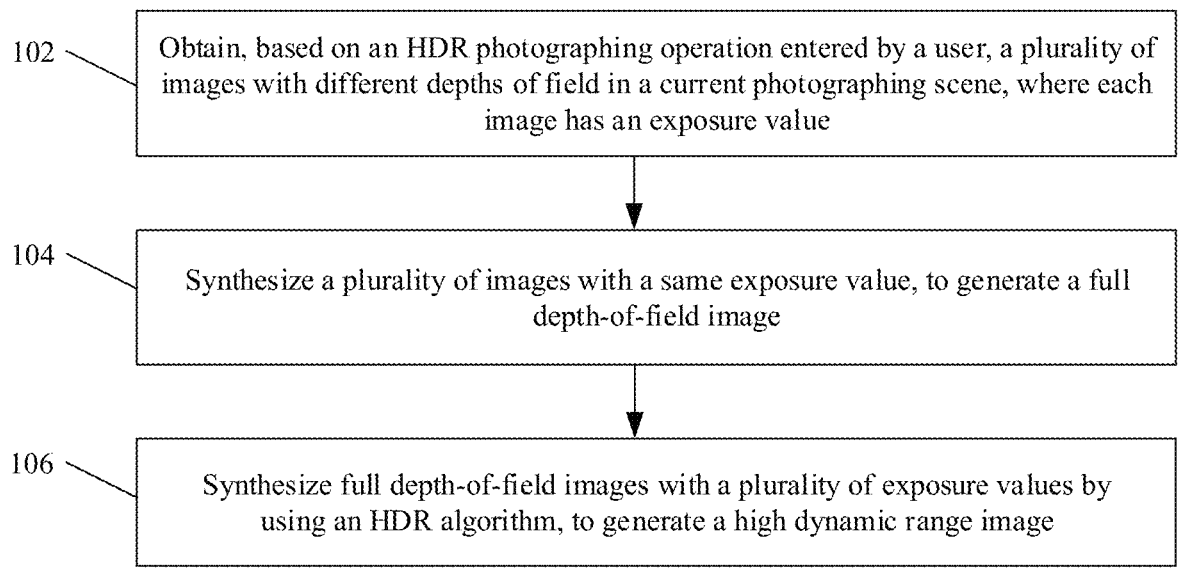
FIG. 6 is a flowchart of a high dynamic range image synthesis method according to an embodiment of this application.

FIG. 6 is a flowchart of a high dynamic range image synthesis method according to an embodiment of this application. As shown in FIG. 6, the method includes the following steps.

Step 102: Obtain, based on an HDR photographing operation entered by a user, a plurality of images with different depths of field in a current photographing scene, where each image has an exposure value.

In this embodiment of this application, before step 102 is performed, an application, such as Camera, with a photographing function needs to be installed on the electronic device 110. After the photographing function of Camera is enabled, the display 115 displays an environment of the current photographing scene. In this case, the plurality of images with the different depths of field in the current photographing scene are obtained based on the HDR photographing operation entered by the user, and each image has an exposure value. It should be noted that exposure values of images may be the same or different.

In this embodiment of this application, for example, three different depths of field and three different exposure values are used as an example to describe the step of obtaining the plurality of images with the different depths of field in the current photographing scene. For example, when the three depths of field includes DOF0, DOF1, and DOF2, and the three exposure values include Exp0, Exp1, and Exp2, nine images with the three depths of field in the current photographing scene are obtained based on the HDR photographing operation entered by the user, where the nine images include an image with the depth of field DOF0 and the exposure value Exp0, an image with the depth of field DOF0 and the exposure value Exp1, an image with the depth of field DOF0 and the exposure value Exp2, an image with the depth of field DOF1 and the exposure value Exp0, an image with the depth of field DOF1 and the exposure value Exp1, an image with the depth of field DOF1 and the exposure value Exp2, an image with the depth of field DOF2 and the exposure value Exp0, an image with the depth of field DOF2 and the exposure value Exp1, and an image with the depth of field DOF2 and the exposure value Exp2.

In actual application, in a related technology, when a plurality of images are to be obtained, only a plurality of images with different exposure values are considered to be obtained, and the plurality of images with the different exposure values are synthesized to generate a high dynamic range image. Therefore, in the solution in the related technology, a photographing background is likely to be blurred. However, in this embodiment of this application, the plurality of images with the different depths of field are obtained in step 102, to facilitate generation of a high dynamic range image in subsequent steps. Therefore, a high dynamic range image that is clear at each depth of field can be obtained, and a problem that a shallow depth of field leads to a blurred background and an insufficient dynamic range, and then results in overexposure or underexposure of a high dynamic range image can be resolved.

Step 104: Synthesize a plurality of images with a same exposure value, to generate a full depth-of-field image.

In this embodiment of this application, the foregoing nine images are used as an example. For example, the image with the depth of field DOF0 and the exposure value Exp0, the image with the depth of field DOF1 and the exposure value Exp0, and the image with the depth of field DOF2 and the exposure value Exp0 are synthesized, so that a full depth-of-field image can be generated. An exposure value of the full depth-of-field image is Exp0, and the full depth-of-field image has three depths of field. In step 104, the foregoing nine images can be synthesized to generate three full depth-of-field images, and each full depth-of-field image has a different exposure value. In other words, after the plurality of images with the same exposure value are synthesized, the generated full depth-of-field image has a plurality of depths of field.

Step 106: Synthesize full depth-of-field images with a plurality of exposure values by using an HDR algorithm, to generate a high dynamic range image.

In this embodiment of this application, the foregoing three generated full depth-of-field images are used as an example.

In step 106, the three full depth-of-field images are synthesized by using the HDR algorithm, to generate a high dynamic range image.

In this embodiment of this application, step 106 may specifically include the following steps.

Step 1061: calculate a synthesis weight of each pixel in the full depth-of-field image with the exposure value based on a pixel value corresponding to each pixel in the full depth-of-field image.

In this embodiment of this application, after the pixel value corresponding to each pixel in the full depth-of-field image is obtained, the synthesis weight is calculated according to a weight calculation formula:

$$\omega_{uniform}(z) = \begin{cases} 1, & \text{if } Z_{min} \leq z \leq Z_{max} \\ 0, & \text{otherwise} \end{cases}$$

Herein, $W_{uniform}(Z)$ represents a synthesis weight of a pixel Z, $Z_{min}$ represents a minimum effective pixel value, $Z_{max}$ represents a maximum effective pixel value, and values of $Z_{min}$ and $Z_{max}$ may be set based on a requirement. In other words, if the pixel Z is within an effective pixel value range, the synthesis weight of the pixel Z is 1, that is, it indicates that the pixel Z can be used as an effective pixel when the high dynamic range image is subsequently obtained through synthesis. If the pixel Z is not within the effective pixel value range, the synthesis weight of the pixel Z is 0, that is, it indicates that the pixel Z cannot be used as an effective pixel when the high dynamic range image is subsequently obtained through synthesis.

Step 1062: Synthesize the full depth-of-field images with the plurality of exposure values based on the obtained synthesis weight of each pixel in the full depth-of-field images with the plurality of exposure values, to generate the high dynamic range image.

In this embodiment of this application, after the synthesis weight of each pixel in the full depth-of-field image is calculated in step 1061, effective pixels in the full depth-of-field images with the plurality of exposure values can be synthesized in step 1062. Therefore, a high dynamic range image that is clear at each depth of field can be generated, and a problem that a blurred background and an insufficient dynamic range result in overexposure or underexposure of a high dynamic range image in the related technology can be resolved.

In this embodiment of this application, a plurality of images with different depths of field in a current photographing scene are obtained based on an HDR photographing operation entered by a user, and each image has an exposure value. A plurality of images with a same exposure value are synthesized to generate a full depth-of-field image. Full depth-of-field images with a plurality of exposure values are synthesized by using an HDR algorithm to generate a high dynamic range image. Therefore, a high dynamic range image that is clear at each depth of field can be obtained, and a problem that a shallow depth of field leads to a blurred background and an insufficient dynamic range, and then results in overexposure or underexposure of a high dynamic range image can be resolved.

Figure 7A:
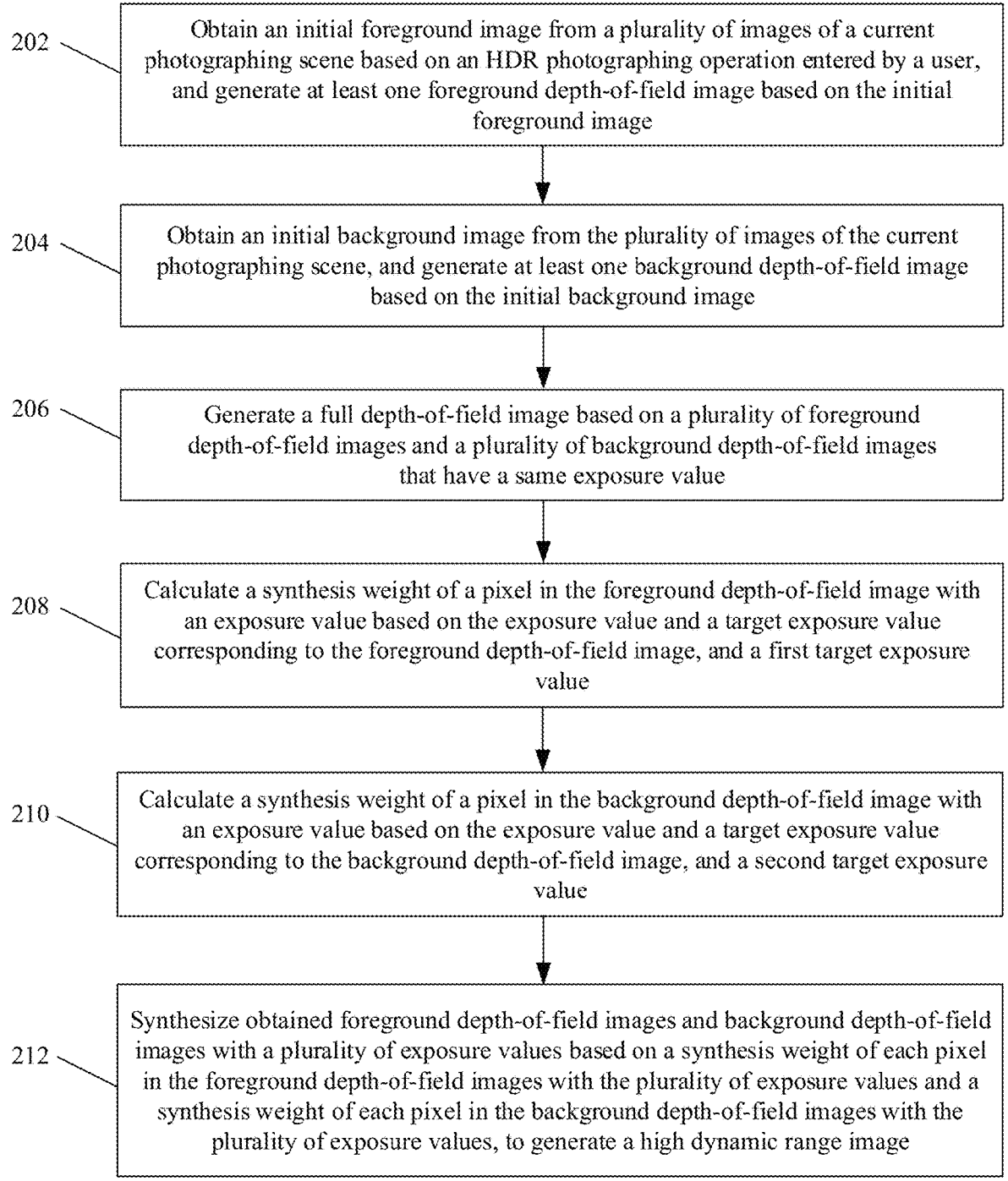
FIG. 7a is a flowchart of another high dynamic range image synthesis method according to an embodiment of this application.
Figure 7B:
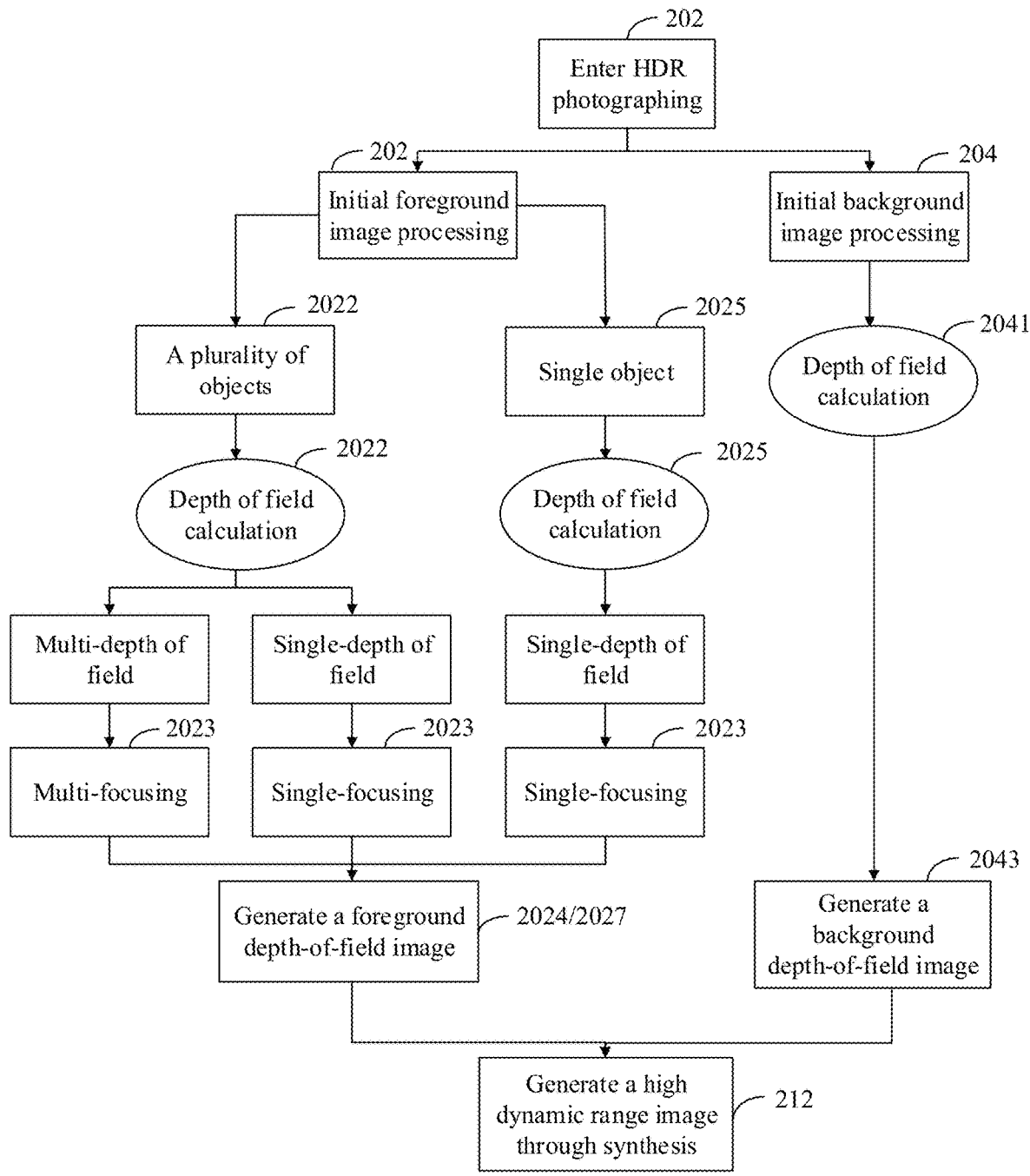
FIG. 7b is a flowchart of another high dynamic range image synthesis method according to an embodiment of this application.

FIG. 7a and FIG. 7b are flowcharts of a high dynamic range image synthesis method according to an embodiment of this application. As shown in FIG. 7a and FIG. 7b, the method includes the following steps.

Step 202: Obtain an initial foreground image from a plurality of images of a current photographing scene based on an HDR photographing operation entered by a user, and generate at least one foreground depth-of-field image based on the initial foreground image.

In this embodiment of this application, as shown in FIG. 1, in a photographing scenario, the camera 111 sends an HDR photographing instruction to the processing center 116 in response to the HDR photographing operation entered by the user. The processing center 116 controls, according to the HDR photographing instruction, Camera on the electronic device 110 to perform photographing. In this case, the camera 111 shoots the plurality of images of the current photographing scene in a continuous multi-frame photographing manner, where the plurality of images include the initial foreground image.

For example, the current photographing scene is a multi-person photographing scene. An image that includes a plurality of objects may be defined as an initial foreground image, and an image obtained by cutting out the plurality of objects is defined as an initial background image. When the objects have different depths of field, at least one foreground depth-of-field image needs to be generated based on the initial foreground image. This may be understood as that one foreground depth-of-field image corresponding to each object is generated based on a depth of field of the object. Therefore, there may be two cases of obtaining a foreground depth-of-field image from a shot image. One case is that a plurality of foreground depth-of-field images are obtained when a quantity of objects in the foreground depth-of-field images is greater than 1, that is, the foreground depth-of-field images include a plurality of objects. The other case is that one foreground depth-of-field image is obtained when a quantity of objects in the foreground depth-of-field image is equal to 1, that is, the foreground depth-of-field image includes one object.

In this embodiment of this application, in step 202, the generating at least one foreground depth-of-field image based on the initial foreground image may specifically include the following steps.

Step 2021: Recognize a quantity of objects from the initial foreground image, and perform step 2022 when the quantity of objects is greater than 1, or perform step 2025 when the quantity of objects is equal to 1.

In this embodiment of this application, the object may include a face or a physical body. In the following steps, an example in which the object includes a face is used for description.

In this embodiment of this application, after a face feature is learned by using a machine learning algorithm, a face can be recognized from a shot image, so that a quantity of faces is determined. When the quantity of faces is greater than 1, it indicates that a current shot image is a multi-person group image. When the quantity of faces is equal to 1, it indicates that a current shot image is a single-person image. The machine learning algorithm is a multi-field interdiscipline, and relates to a plurality of disciplines such as a probability theory, statistics, an approximation theory, convex analysis, and an algorithm complexity theory. How a computer simulates or implements human learning behavior is studied, to obtain new knowledge or skills, and reorganize existing knowledge structures to continuously improve its performance. In this embodiment of this application, after learning of a face feature, a computer can have a face recognition function, so that a quantity of faces in the foreground depth-of-field image can be recognized according to the machine learning algorithm.

Step 2022: Determine first object depths of field corresponding to the plurality of objects.

In this embodiment of this application, a first face depth of field corresponding to the face may be obtained in a manner such as phase focusing, a dual-camera depth algorithm, or a 3D photosensitive technology. The dual-camera depth algorithm is an algorithm for obtaining a physical distance between an object in a photographing scene and a camera by using a dual-camera depth camera.

In this embodiment of this application, in an optional solution, before step 2022 is performed, the method further includes: determining whether the quantity of objects is greater than 1 and less than N or is greater than or equal to N; and if it is determined that the quantity of objects is greater than 1 and less than N, determining a first object depth of field corresponding to each object; or if it is determined that the quantity of objects is greater than or equal to N, determining first object depths of field corresponding to the N objects.

For example, in a case of N=3, when the recognized quantity of objects is 4, because 4>N, first object depths of field corresponding to only first three objects need to be determined. This can reduce workload of an image processing unit, and avoid a problem that image processing efficiency is low because a first object depth of field corresponding to each object needs to be determined when there are an excessively large quantity of objects.

Step 2023: Perform focusing on a plurality of objects with different first object depths of field, to obtain a plurality of first object focusing regions.

In this embodiment of this application, the sensor 113 can perform focusing on a face in each first face depth of field. In step 2022, because a plurality of faces are recognized by using the shot image, focusing needs to be performed on the plurality of faces simultaneously.

In this embodiment of this application, for example, as shown in FIG. 3, a face 1 is in the foreground, a face 2 is in the background, and the face 1 and the face 2 have different depths of field. Therefore, for the shot image in FIG. 3, the image processing unit 112 needs to separately perform focusing on the face 1 and the face 2, to separately obtain a first face focusing region corresponding to the face 1 and a first face focusing region corresponding to the face 2.

Further, the method further includes: if it is determined that a plurality of first face depths of field are within a same depth-of-field range, performing focusing on faces in face depths of field within a same depth-of-field range once, to obtain one first face focusing region.

Step 2024: Generate a plurality of foreground depth-of-field images based on the initial foreground image, the plurality of first object focusing regions, a plurality of first object depths of field, and corresponding exposure values.

In a photographing scenario, the camera can measure an exposure value of a shot picture based on a photometric system, where the photometric system may include a 3D photosensitive component. In this embodiment of this application, step 2024 may specifically include: generating the plurality of foreground depth-of-field images based on the initial foreground image, the plurality of first object focusing regions, the plurality of first object depths of field, and the corresponding exposure values by using step 21 in a high dynamic range image synthesis algorithm for a photographing scene. The high dynamic range image synthesis algorithm for the photographing scene is shown in Table 3 below.

TABLE 3

High dynamic range image synthesis algorithm for a photographing scene

| | Step 21 | | | Step 22 | Step 23 | Step 24 | Synthesis result |
|---|---|---|---|---|---|---|---|
| | Exp0 | Exp1 | Exp2 | | | | |
| DOF0 (foreground) | E0D0 | \ | \ | Image registration | Weight calculation | Synthesis (portrait matting, luminance keeping Ex0) | Synthesized picture with an HDR and a depth of field |
| DOF1 (background) | \ | E1D1 | E2D1 | | | | |

In the foregoing Table 3, step 21 includes: obtaining three images shot by a camera by photographing a same photographed object in a continuous multi-frame photographing manner, where the three depth-of-field images include one generated foreground depth-of-field image and two generated background depth-of-field images, and each depth-of-field image has a different exposure value. The first generated foreground depth-of-field image includes an image with a depth of field DOF0 and an exposure value Exp0, the first generated background depth-of-field image includes an image with a depth of field DOF1 and an exposure value Exp1, and the second generated background depth-of-field image includes an image with a depth of field DOF1 and an exposure value Exp2. It should be noted that the images in step 21 are merely an example for description, and a quantity of shot images, a quantity of generated foreground depth-of-field images, a quantity of generated background depth-of-field images, and depths of field and exposure values corresponding to the generated foreground depth-of-field image and the generated background depth-of-field image are all not limited.

Step 22 includes a process of performing matching and superimposition on the three obtained depth-of-field images. Specifically, step 22 includes: correcting a difference between the three shot depth-of-field images. If it is determined that the difference between the three depth-of-field images is greater than a preset value, synthesis in a subsequent step cannot be performed. The difference between the images may include a position deviation between the images.

Step 23 includes: calculating, based on a pixel value corresponding to each pixel in each obtained depth-of-field image, a synthesis weight corresponding to each pixel in each depth-of-field image.

Step 24 includes: synthesizing the three depth-of-field images based on the synthesis weight corresponding to each pixel in the three depth-of-field images, to generate a high dynamic range image.

In this embodiment of this application, for an execution process of step 2024, because all obtained first face depths of field are different, an obtained face image may be in a foreground or background. For each foreground depth-of-field image, the image processing unit 112 needs to generate a plurality of foreground depth-of-field images based on the initial foreground image, a plurality of first object focusing regions, a plurality of first object depths of field, and corresponding exposure values by using step 21 in the foregoing high dynamic range image synthesis algorithm for the photographing scene. For example, the initial foreground image includes two faces. If an exposure value corresponding to a first face depth of field corresponding to each face is Exp1, two foreground depth-of-field images are generated based on the initial foreground image, the plurality of first object focusing regions, the plurality of first object depths of field, and the corresponding exposure values.

In an optional solution, FIG. 3 is used as an example. A focusing region of the face 1, a first face depth of field DOF0 corresponding to the face 1, a focusing region of the face 2, and a first face depth of field DOF1 corresponding to the face 2 are obtained from the initial foreground image, and two foreground depth-of-field images are generated based on the initial foreground image, the focusing region of the face 1, the focusing region of the face 2, the first face depth of field DOF0 corresponding to the face 1, the first face depth of field DOF1 corresponding to the face 2, and corresponding exposure values. The two foreground depth-of-field images include a foreground depth-of-field image corresponding to the face 1 and a foreground depth-of-field image corresponding to the face 2. In other words, the foreground depth-of-field images include an image with the depth of field DOF0 and an image with the depth of field DOF1. In other words, in this embodiment of this application, according to the solution for generating a plurality of foreground depth-of-field images, the focusing region of the face 2 and the first face depth of field DOF1 corresponding to the face 2 are obtained, and the foreground depth-of-field image corresponding to the face 2 is generated based on the initial foreground image, the focusing region of the face 2, the first face depth of field DOF1 corresponding to the face 2, and the corresponding exposure value. This can resolve a problem that the face image 2 in the background is blurred in a related technology.

In this embodiment of this application, the foregoing technical solution is used. In comparison with a related technology, in this application, the plurality of foreground depth-of-field images are generated based on the initial foreground image, the plurality of first object focusing regions, the plurality of first object depths of field, and the corresponding exposure values. In this way, an image that is clear at each depth of field can be obtained, and a problem of blurring of the face image in the background can be avoided.

In this embodiment of this application, before step 2024, the method further includes: detecting whether contrast between a plurality of face focusing regions is less than a preset contrast value.

In this embodiment of this application, for example, the preset contrast is 20%. Whether obtained images can be synthesized into a high dynamic range image is determined by detecting the contrast between the plurality of face focusing regions. For example, when contrast between different face focusing regions exceeds 20%, a step of obtaining a high dynamic range image through synthesis cannot be continued, that is, step 2024 cannot be continued.

Figure 8:
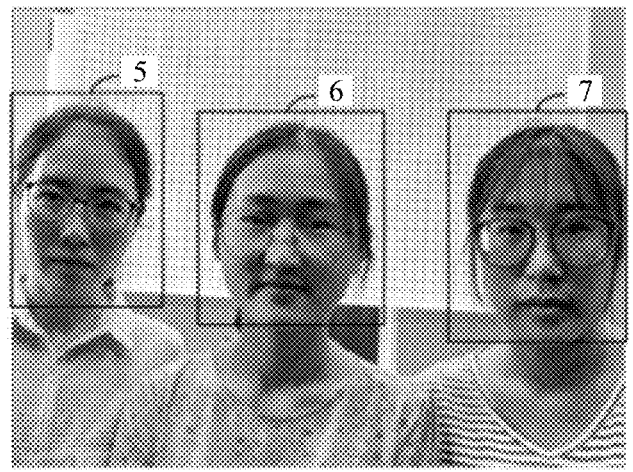
FIG. 8 is a schematic diagram of an effect of recognizing a quantity of faces according to an embodiment of this application.

For example, as shown in FIG. 8, in the photographing scene, three faces are recognized, and then three face focusing regions are determined, which are respectively a focusing region 5, a focusing region 6, and a focusing region 7 in FIG. 8. Contrast between the three face focusing regions is detected by performing step 111. If it is detected that the contrast between the three face focusing regions exceeds the preset contrast value, step 2024 for generating a foreground depth-of-field image cannot be continued, that is, a subsequent step for generating a high dynamic range image cannot be performed.

In this embodiment of this application, if it is detected that the contrast between the plurality of face focusing regions is less than the preset contrast value, step 2024 continues to be performed. Step 2025: Determine a second object depth of field corresponding to the object.

In this embodiment of this application, a second face depth of field corresponding to the face may be obtained in a manner such as phase focusing, a dual-camera depth algorithm, or a 3D photosensitive technology. The dual-camera depth algorithm is an algorithm for obtaining a physical distance between an object in a photographing scene and a camera by using a dual-camera depth camera.

Step 2026: Perform focusing on the object with the second object depth of field, to obtain a second object focusing region.

Figure 9:
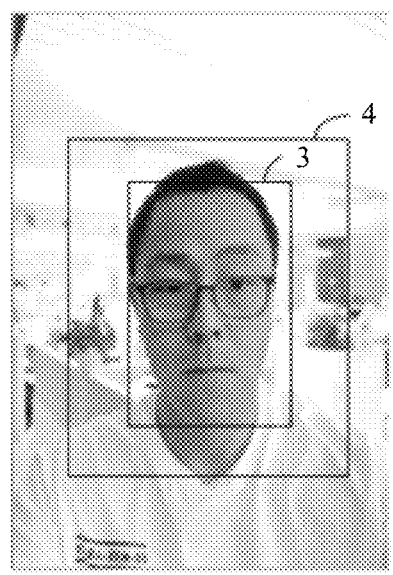
FIG. 9 is a schematic diagram of a structure of obtaining a focusing region on a face according to an embodiment of this application.

In this embodiment of this application, because one object is recognized in the obtained foreground depth-of-field image, focusing needs to be performed on only the face. A manner of obtaining a second face focusing region is shown in FIG. 9. After determining a face image region 3 from the initial foreground image, the image processing unit 112 extends an area of the face image region 3 to a preset area, to generate a face image region 4, and removes a body region in the face image 4 from the initial foreground image, to generate the second face focusing region. A ratio of a difference between the preset area and the area of the face image region 3 to the preset area includes 20%.

Step 2027: Generate one foreground depth-of-field image based on the initial foreground image, the second object focusing region, the second object depth of field, and a corresponding exposure value.

In this embodiment of this application, for a process of generating one foreground depth-of-field image in step 2027, refer to step 2024. A difference between step 2027 and step 2024 is as follows: Step 2024 is that the image processing unit 112 generates, based on different faces, foreground depth-of-field images corresponding to the faces, to generate a plurality of foreground depth-of-field images. Step 2027 is that the image processing unit 112 generates, based on a same face, one foreground depth-of-field image corresponding to the face.

As shown in step 21 in the foregoing Table 3, for example, a face is in a foreground, a foreground depth-of-field image corresponding to the face is generated based on an initial foreground image, a second face focusing region corresponding to the face, a second face depth of field DOF0, and an exposure value Exp0 corresponding to the second face depth of field.

Step 204: Obtain an initial background image from the plurality of images of the current photographing scene, and generate at least one background depth-of-field image based on the initial background image, where each foreground depth-of-field image has an exposure value and each background depth-of-field image has an exposure value.

In this embodiment of this application, as shown in FIG. 1, in a photographing scenario, the camera 111 sends an HDR photographing instruction to the processing center 116 in response to the HDR photographing operation entered by the user. The processing center 116 controls, according to the HDR photographing instruction, Camera on the electronic device 110 to perform photographing. In this case, the camera 111 shoots the plurality of images of the current photographing scene in a continuous multi-frame photographing manner, where the plurality of images include the initial background image.

For example, the current photographing scene is a multi-person photographing scene. An image that includes a plurality of objects may be defined as an initial foreground image, and an image obtained by cutting out the plurality of objects is defined as an initial background image. The background depth-of-field image is generated based on the initial background image, and the background depth-of-field image includes an image that uses a background as a focusing region. For example, as shown in FIG. 4, the image processing unit 112 cuts out a face image from a shot image by using a portrait segmentation algorithm, to obtain an initial background image, and then generates at least one background depth-of-field image based on the initial background image.

In this embodiment of this application, in an optional solution, an execution process of generating the at least one background depth-of-field image based on the initial background image in step 204 may specifically include the following steps.

Step 2041: Determine at least one background depth of field from the initial background image based on a preset depth-of-field range, where the background depth of field is greater than the first object depth of field or the second object depth of field.

In this embodiment of this application, for example, the preset depth-of-field range is greater than 40 cm. In step 2041, a manner of determining the at least one background depth of field from the initial background image may include: determining depths of field within a depth-of-field range greater than 40 cm and less than 1 m as one background depth of field; determining depths of field within a depth-of-field range greater than 1 m and less than 2 m as another background depth of field; and determining depths of field within a depth-of-field range greater than 2 m as still another background depth of field. Alternatively, depths of field within a depth-of-field range greater than 40 cm may be determined as one background depth of field, that is, both an obtained background depth of field at 1 m and an obtained background depth of field at 2 m are used as a same background depth of field. A specific division manner of the depth-of-field range of the background depth of field is not limited in this application.

Step 2042: Perform focusing on the at least one background depth of field, to obtain at least one background focusing region.

In this embodiment of this application, the image processing unit 112 separately performs focusing on different background depths of field in the initial background image, to obtain the at least one background focusing region.

In an optional solution, according to the division manner in step 2041, focusing is performed on a background image corresponding to the background depth of field within the depth-of-field range greater than 40 cm and less than 1 m, to obtain one background focusing region; focusing is performed on a background image corresponding to the background depth of field within the depth-of-field range greater than 1 m and less than 2 m, to obtain another background focusing region; and focusing is performed on a background image corresponding to the background depth of field within the depth-of-field range greater than 2 m, to obtain another background focusing region, so that three background focusing regions can be obtained according to step 2041.

In another optional solution, according to the division manner in step 2041, the depths of field within the depth-of-field range greater than 40 cm are determined as one background depth of field, and focusing is performed on a background image corresponding to the background depth of field within the depth-of-field range greater than 40 cm, to obtain one background focusing region. Therefore, only one background focusing region can be obtained according to step 2041.

Step 2043: Generate the at least one background depth-of-field image based on the initial background image, the at least one background focusing region, and the at least one background depth of field.

In this embodiment of this application, in an optional solution, the image processing unit 112 may generate the at least one background depth-of-field image based on the initial background image, the at least one background focusing region, each background depth of field, and at least one exposure value corresponding to each background depth of field according to step 21 in the high dynamic range image synthesis algorithm for the photographing scene in the foregoing Table 3. For example, as shown in Table 3, Table 3 uses an example in which the depths of field within the depth-of-field range greater than 40 cm are determined as one background depth of field in the initial background image, that is, background images corresponding to the background depth of field within the depth-of-field range greater than 40 cm are determined as a same background. Therefore, according to the high dynamic range image synthesis algorithm for the photographing scene in Table 3, for the background depth of field DOF1 within the depth-of-field range greater than 40 cm, two background depth-of-field images can be generated based on the initial background image, background focusing regions, the background depth of field, and corresponding exposure values Exp1 and Exp2.

In another optional solution, for example, according to the division manner in step 2041, when three depth-of-field ranges are obtained through division in the initial background image, the image processing unit 112 may generate three background depth-of-field images based on the initial background image, three background focusing regions, three background depths of field, and corresponding exposure values according to step 31 in a high dynamic range image synthesis algorithm for a photographing scene in the following Table 4. Specifically, for the background depth of field DOF0 within the depth-of-field range greater than 40 cm and less than 1 m, a background depth-of-field image corresponding to the background depth of field is generated based on the initial background image, a background focusing region corresponding to the background depth of field, and a corresponding exposure value Exp0. For the background depth of field DOF1 within the depth-of-field range greater than 1 m and less than 2 m, a background depth-of-field image corresponding to the background depth of field is generated based on the initial background image, a background focusing region corresponding to the background depth of field, and a corresponding exposure value Exp1. For the background depth of field DOF2 within the depth-of-field range greater than 2 m, a background depth-of-field image corresponding to the background depth of field is generated based on the initial background image, a background focusing region corresponding to the background depth of field, and a corresponding exposure value Exp2. Therefore, three background depth-of-field images can be generated by performing step 31. It should be noted that a manner of generating a background depth-of-field image in step 31 is merely an example for description, and a quantity of background depths of field (a quantity of backgrounds) and exposure values corresponding to different background depths of field are not limited.

TABLE 4

High dynamic range image synthesis algorithm for a photographing scene Step 31

|  | Exp0 | Exp1 | Exp2 |
| --- | --- | --- | --- |
| DOF0 (background) | E0D0 | \ | \ |
| DOF1 (background) | \ | E1D1 | \ |
| DOF2 (background) | \ | \ | E2D2 |

In this embodiment of this application, the foregoing technical solution is used. In comparison with a related technology, in this application, the at least one background depth-of-field image is generated based on the initial background image, the at least one background focusing region, each background depth of field, and the at least one exposure value corresponding to each background depth of field. This avoids a problem that a background in a photographing scene is blurred.

After step 204, the method further includes: performing image registration on the foreground depth-of-field image and the background depth-of-field image; and continuing to perform step 206 if it is determined that an image difference between the foreground depth-of-field image and the background depth-of-field image is less than a preset value.

In this embodiment of this application, an image registration process corresponds to step 22 in the high dynamic range image synthesis algorithm in Table 3. In this embodiment of this application, image registration is performed on the foreground depth-of-field image and the background depth-of-field image, to correct a difference between shot images. This avoids a problem of low quality of a high dynamic range image generated after images with an excessively large image difference are synthesized.

Step 206: Generate a full depth-of-field image based on a plurality of foreground depth-of-field images and a plurality of background depth-of-field images that have a same exposure value.

In this embodiment of this application, for an execution process of step 206, refer to step 104.

Step 208: Calculate a synthesis weight of each pixel in the foreground depth-of-field image with the exposure value based on a pixel value corresponding to each pixel in the foreground depth-of-field image.

In this embodiment of this application, after the pixel value corresponding to each pixel in the foreground depth-of-field image is obtained, the synthesis weight is calculated according to a weight calculation formula:

$$\omega_{uniform}(z) = \begin{cases} 1, & \text{if } Z_{min} \leq z \leq Z_{max} \\ 0, & \text{otherwise} \end{cases}$$

Herein, $W_{uniform}(Z)$ represents a synthesis weight of a pixel Z, $Z_{min}$ represents a minimum effective pixel value, $Z_{max}$ represents a maximum effective pixel value, and values of $Z_{min}$ and $Z_{max}$ may be set based on a requirement. In other words, if the pixel Z is within an effective pixel value range, the synthesis weight of the pixel Z is 1, that is, it indicates that the pixel Z can be used as an effective pixel when the high dynamic range image is subsequently obtained through synthesis. If the pixel Z is not within the effective pixel value range, the synthesis weight of the pixel Z is 0, that is, it indicates that the pixel Z cannot be used as an effective pixel when the high dynamic range image is subsequently obtained through synthesis. Step 210: Calculate a synthesis weight of each pixel in the background depth-of-field image with the exposure value based on a pixel value corresponding to each pixel in the background depth-of-field image.

In this embodiment of this application, for an execution process of this step, refer to step 208. An only difference lies in that the synthesis weight of each pixel in the background depth-of-field image with the exposure value is calculated based on the pixel value corresponding to each pixel in the background depth-of-field image in step 210.

Step 212: Synthesize obtained foreground depth-of-field images and background depth-of-field images with a plurality of exposure values based on a synthesis weight of each pixel in the foreground depth-of-field images with the plurality of exposure values and a synthesis weight of each pixel in the background depth-of-field images with the plurality of exposure values, to generate a high dynamic range image.

In this embodiment of this application, after the synthesis weight of each pixel in the corresponding depth-of-field images is calculated in step 208 to step 210, effective pixels in the foreground depth-of-field images and background depth-of-field images with the plurality of exposure values can be synthesized in step 212. Therefore, a high dynamic range image that is clear at each depth of field can be generated, and a problem that a blurred background and an insufficient dynamic range result in overexposure or underexposure of a high dynamic range image in the related technology can be resolved.

Figure 10:
FIG. 10 is a schematic diagram of a high dynamic range image obtained through synthesis in a backlight scenario according to an embodiment of this application.
Figure 11:
FIG. 11 is a schematic diagram of an image obtained in a common photographing manner in a backlight scenario in a related technology.
Figure 12:
FIG. 12 is a schematic diagram of an image obtained through HDR photographing in a backlight scenario in a related technology.

In embodiments of this application, for example, FIG. 10 shows a high dynamic range image obtained through synthesis in a backlight scenario according to an embodiment of this application. FIG. 11 shows an image obtained in a common photographing manner in a backlight scenario according to the conventional technology. FIG. 12 shows an image obtained through HDR photographing in a backlight scenario according to the conventional technology. As shown in FIG. 11, the image has a feature of an overexposed and blurred background. Alternatively, as shown in FIG. 12, the image has a feature of a non-overexposed and unclear background. As shown in FIG. 10, compared with the image provided by using the related technology, the high dynamic range image generated in this application has features of clear depths of field and a non-overexposed background. Therefore, compared with the conventional technology, in the technical solutions used in embodiments of this application, each face depth of field is determined to obtain a foreground depth-of-field image corresponding to each face through synthesis, and each background depth of field is determined to obtain a background depth-of-field image corresponding to each background through synthesis, so that the depth of field is enhanced. In a photographing scenario, when a face is in focus and clear, there can be features of a clear foreground and a clear background, and a problem that a larger aperture leads to a shallower depth of field can be resolved, thereby effectively resolving a problem of blurring of a photographing background.

In this embodiment of this application, the method further includes: using a foreground depth-of-field image with an exposure value Exp0 as a reference image, and generating a high dynamic range image base on the reference image, a background depth-of-field image, and a calculated synthesis weight of a background pixel. To be specific, a pixel in the foreground depth-of-field image with the exposure value Exp0 is used as an effective pixel, effective range values $Z_{min}$ and $Z_{max}$ of the pixel are obtained base on the foreground depth-of-field image with the exposure value Exp0, a synthesis weight of each pixel in the background depth-of-field image is calculated based on the effective range values, and the high dynamic range image is generated based on the foreground depth-of-field image, the background depth-of-field image, and the calculated synthesis weight of the background pixel. Therefore, a high dynamic range image that is clear at each depth of field can be obtained, and high dynamic range image synthesis efficiency can be further improved.

In the technical solutions provided in embodiments of this application, a plurality of images with different depths of field in a current photographing scene are obtained based on an HDR photographing operation entered by a user, and each image has an exposure value. A plurality of images with a same exposure value are synthesized to generate a full depth-of-field image. Full depth-of-field images with a plurality of exposure values are synthesized by using an HDR algorithm to generate a high dynamic range image. Therefore, a high dynamic range image that is clear at each depth of field can be obtained, and a problem that a shallow depth of field leads to a blurred background and an insufficient dynamic range, and then results in overexposure or underexposure of a high dynamic range image can be resolved.

Figure 13A:
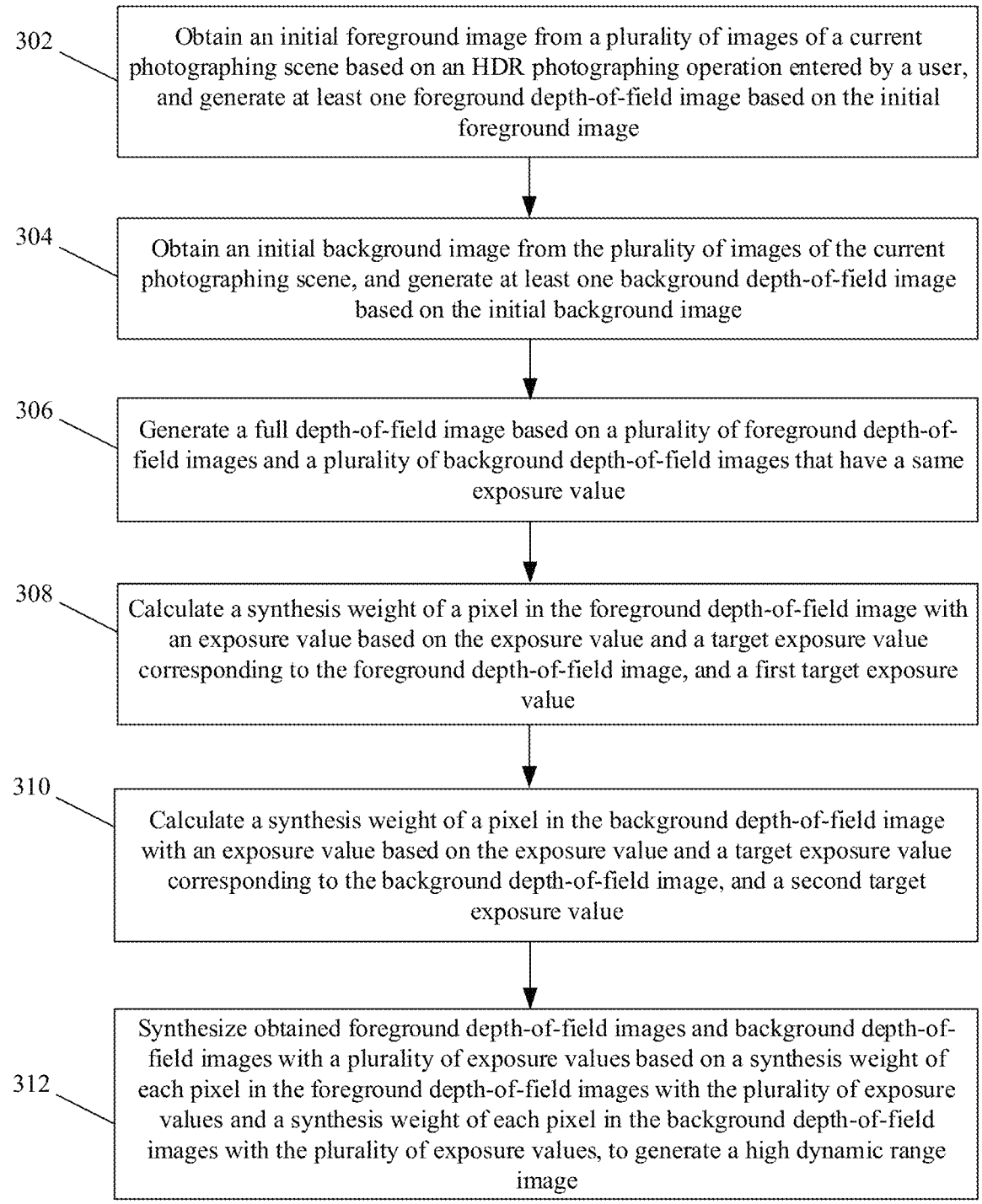
FIG. 13a is a flowchart of another high dynamic range image synthesis method according to an embodiment of this application.
Figure 13B:
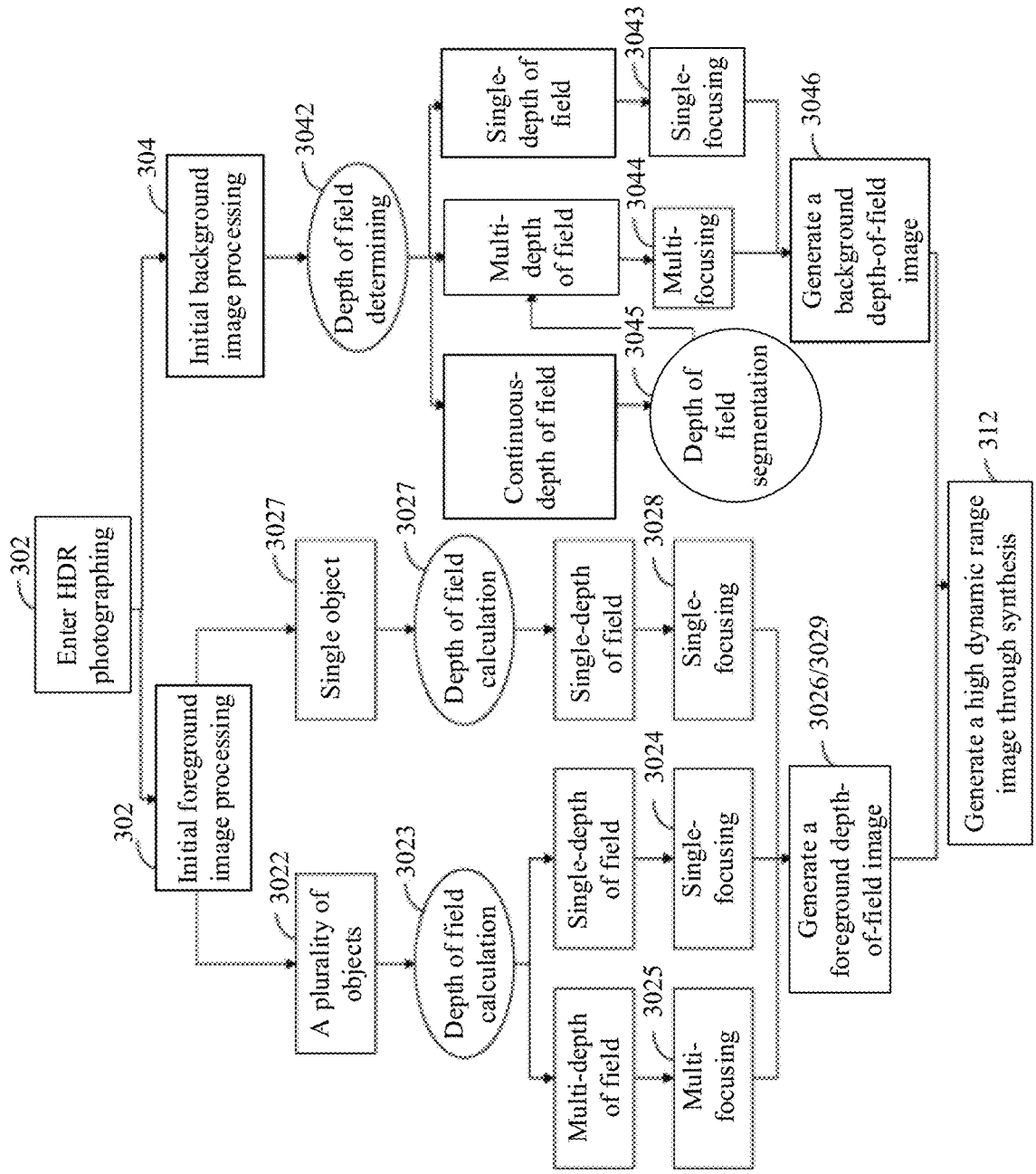
FIG. 13b is a flowchart of another high dynamic range image synthesis method according to an embodiment of this application.

FIG. 13a and FIG. 13b are flowcharts of a high dynamic range image synthesis method according to an embodiment of this application. As shown in FIG. 13a and FIG. 13b, the method includes the following steps.

Step 302: Obtain an initial foreground image from a plurality of images of a current photographing scene based on an HDR photographing operation entered by a user, and generate at least one foreground depth-of-field image based on the initial foreground image.

In this embodiment of this application, for an execution process of this step, refer to step 202.

In this embodiment of this application, in step 302, the generating at least one foreground depth-of-field image based on the initial foreground image may specifically include the following steps.

Step 3021: Recognize a quantity of objects from the initial foreground image, and perform step 3022 when the quantity of objects is greater than 1.

When the quantity of objects is equal to 1, step 3027 is performed.

In this embodiment of this application, for an execution process of this step, refer to step 2021.

Step 3022: Determine a first object depth of field corresponding to each object.

In this embodiment of this application, for an execution process of this step, refer to step 2022.

Step 3023: Determine whether first object depths of field corresponding to all objects are within a same depth-of-field range, and perform step 3024 if the first object depths of field corresponding to all the objects are within the same depth-of-field range, or perform step 3025 if the first object depths of field corresponding to all the objects are not within the same depth-of-field range.

In this embodiment of this application, for example, the object includes a face. If it is determined that a plurality of first face depths of field are within a same depth-of-field range, it indicates that a plurality of faces are within the same depth-of-field range. For example, the current photographing scene is a case in which a plurality of persons are photographed side by side. If it is determined that a plurality of first face depths of field are not within a same depth-of-field range, it indicates that a plurality of faces are not within the same depth-of-field range. For example, the current photographing scene is a case in which a plurality of persons are photographed in different rows.

Step 3024: Perform focusing on faces in the first object depths of field within the same depth-of-field range, to obtain one first object focusing region.

In this embodiment of this application, focusing is performed once on the faces in the first object depths of field within the same depth-of-field range, to obtain one first object focusing region.

Step 3025: Perform focusing on faces in a plurality of first object depths of field, to obtain a plurality of first object focusing regions.

In this embodiment of this application, for an execution process of this step, refer to step 2023.

Step 3026: Generate a plurality of foreground depth-of-field images based on the initial foreground image, the plurality of first object focusing regions, the plurality of first object depths of field, and corresponding exposure values.

In a photographing scenario, a camera can measure an exposure value of a shot picture based on a photometric system, where the photometric system may include a 3D photosensitive component. In this embodiment of this application, step 3026 may specifically include: generating the plurality of foreground depth-of-field images based on the initial foreground image, the plurality of first object focusing regions, the plurality of first object depths of field, and the corresponding exposure values by using step 31 in a high dynamic range image synthesis algorithm for a photographing scene. The high dynamic range image synthesis algorithm for the photographing scene is shown in Table 5 below.

TABLE 5

| High dynamic range image synthesis algorithm for a photographing scene | | | | | | | |
|---|---|---|---|---|---|---|---|
| Step 31 | | Step 32 | Step 33 | Step 34 | Step 35 | Step 36 | Synthesis result |
| DOF0 | Exp0 ... Expn E0D0 ... EnD0 | Image registration | Weight calculation | Synthesis (HDR) 1 | Image registration (depth of field) | Synthesis (depth of field) | Synthesized picture with an HDR and a depth of field |
| ... | ... ... ... ... | ... | ... | ... | | | |
| DOEn | E0Dn ... EnDn | Image registration | Weight calculation | Synthesis (HDR) n | | | |

In the foregoing Table 5, step 31 includes: obtaining three images shot by a camera by photographing a same photographed object in a continuous multi-frame photographing manner, where the three depth-of-field images include n generated depth-of-field images, and the n depth-of-field images have corresponding exposure values.

For example, a depth of field of an image is DOF0, and the depth of field corresponds to n exposure values, which specifically include an exposure value Exp0 to an exposure value Expn.

Step 32 includes a process of performing matching and superimposition on then obtained images. Specifically, step 32 includes: correcting a difference between the n shot images. If it is determined that the difference between the n images is greater than a preset value, synthesis in a subsequent step cannot be performed. The difference between the images may include a position deviation between the images.

Step 33 includes: calculating, based on a pixel value corresponding to each pixel in each obtained image, a synthesis weight corresponding to each pixel in each image.

Step 34 includes: generating n initial high dynamic range images based on the n obtained images and the calculated synthesis weight corresponding to each pixel in the n images.

Step 35 includes: performing secondary image registration on the n generated initial high dynamic range images. Specifically, step 35 includes: correcting a difference between the n shot images. If it is determined that the difference between the n images is greater than a preset value, synthesis in a subsequent step cannot be performed.

Step 36 includes: synthesizing the n generated initial high dynamic range images, to generate a high dynamic range image.

A difference between an execution process of step 3026 and an execution process of step 2024 lies in that each foreground depth-of-field image corresponds to n exposure values in step 3026.

In this embodiment of this application, the foregoing technical solution is used. In comparison with a related technology, in this application, the plurality of foreground depth-of-field images are generated based on the initial foreground image, the plurality of first object focusing regions, the plurality of first object depths of field, and the corresponding exposure values. In this way, a problem of blurring of the face image in the background can be avoided.

Step 3027: Determine a second object depth of field corresponding to the face.

In this embodiment of this application, for an execution process of this step, refer to step 2025.

Step 3028: Perform focusing on the face in the second object depth of field, to obtain a second object focusing region.

In this embodiment of this application, for an execution process of this step, refer to step 2026.

Step 3029: Generate one foreground depth-of-field image based on the initial foreground image, the second object focusing region, the second object depth of field, and a corresponding exposure value.

In this embodiment of this application, for an execution process of this step, refer to step 2027.

Step 304: Obtain an initial background image from the plurality of images of the current photographing scene, and generate at least one background depth-of-field image based on the initial background image, where each foreground depth-of-field image has an exposure value and each background depth-of-field image has an exposure value.

In this embodiment of this application, for an execution process of this step, refer to step 204.

Step 304 may include the following specific steps.

Step 3041: Determine at least one background depth of field from the initial background image based on a preset depth-of-field range, where the background depth of field is greater than the first object depth of field or the second object depth of field.

In this embodiment of this application, for an execution process of this step, refer to step 2041.

Step 3042: Determine a depth-of-field type of the at least one background depth of field, where the depth-of-field type includes continuous-depth of field, multi-depth of field, or single-depth of field; and perform step 3043 if it is determined that the depth-of-field type of the at least one background depth of field is the single-depth of field; or perform step 3044 if it is determined that the depth-of-field type of the at least one background depth of field is the multi-depth of field; or perform step 3045 if it is determined that the depth-of-field type of the at least one background depth of field is the continuous-depth of field.

In this embodiment of this application, the continuous-depth of field is used to indicate a depth of field corresponding to a background in which a same object continuously extends. For example, a depth of field corresponding to a wall is a continuous depth of field. The multi-depth of field is used to indicate depths of field corresponding to a background having a plurality of different depths of field, for example, depths of field corresponding to a background including a combination of a chair at 50 cm and a table at 2 m. The single-depth of field is used to indicate a depth of field corresponding to a background greater than a preset depth-of-field range, for example, a depth of field corresponding to a background including a building 10 meters away.

In this embodiment of this application, if it is determined that the depth-of-field type of the at least one background depth of field is the single-depth of field, it indicates that the at least one background depth of field includes only one background depth of field. If it is determined that the depth-of-field type of the at least one background depth of field is the multi-depth of field, it indicates that the at least one background depth of field includes a plurality of background depths of field. If it is determined that the depth-of-field type of the at least one background depth of field is the continuous-depth of field, it indicates that the at least one background depth of field includes a plurality of background depths of field, and the continuous depth of field needs to be segmented to obtain a plurality of depths of field.

Step 3043: Perform focusing on a background image corresponding to a single depth of field, to obtain one background focusing region.

In this embodiment of this application, for a process of obtaining the background focusing region in this step, refer to step 2042.

Step 3044: Perform focusing on a background image corresponding to a plurality of different background depths of field, to obtain a plurality of background focusing regions.

In this embodiment of this application, for a process of obtaining the background focusing regions in this step, refer to step 2042.

Step 3045: Segment a background image corresponding to a continuous depth of field to obtain a plurality of depths of field, and continue to perform step 3044.

In this embodiment of this application, when the depth-of-field type of the background depth of field is the continuous-depth of field, it indicates that the at least one background depth of field includes a plurality of background depths of field, the continuous depth of field needs to be segmented to obtain a plurality of depths of field, and focusing continues to be performed on a background image corresponding to the plurality of depths of field to obtain a plurality of background focusing regions. For a process of obtaining the plurality of background focusing regions, refer to step 3044.

Step 3046: Generate the at least one background depth-of-field image based on the initial background image, the at least one background focusing region, and the at least one background depth of field.

In this embodiment of this application, step 3046 may specifically include: generating the at least one background depth-of-field image based on the initial background image, the at least one background focusing region, and the at least one background depth of field according to step 31 in a high dynamic range image synthesis algorithm for a photographing scene. The high dynamic range image synthesis algorithm for the photographing scene is shown in the foregoing Table 5.

A difference between an execution process of step 3046 and an execution process of step 2043 lies in that each background depth-of-field image corresponds to n exposure values in step 3046.

After step 304, the method further includes: performing image registration on the foreground depth-of-field image and the background depth-of-field image; and continuing to perform step 306 if it is determined that an image difference between the foreground depth-of-field image and the background depth-of-field image is less than a preset value.

In this embodiment of this application, an image registration process corresponds to step 36 in the high dynamic range image synthesis algorithm in Table 5. In this embodiment of this application, image registration is performed on the foreground depth-of-field image and the background depth-of-field image, to correct a difference between shot images. This avoids a problem of low quality of a high dynamic range image generated after images with an excessively large image difference are synthesized.

Step 306: Generate a full depth-of-field image based on a plurality of foreground depth-of-field images and a plurality of background depth-of-field images that have a same exposure value.

In this embodiment of this application, for an execution process of step 306, refer to step 104.

Step 308: Calculate a synthesis weight of a pixel in the foreground depth-of-field image with the exposure value based on a pixel value corresponding to each pixel in the foreground depth-of-field image.

In this embodiment of this application, for an execution process of this step, refer to step 208.

Step 310: Calculate a synthesis weight of a pixel in the background depth-of-field image with the exposure value based on a pixel value corresponding to each pixel in the background depth-of-field image.

In this embodiment of this application, for an execution process of this step, refer to step 210.

Step 312: Synthesize obtained foreground depth-of-field images and background depth-of-field images with a plurality of exposure values based on a synthesis weight of each pixel in the foreground depth-of-field images with the plurality of exposure values and a synthesis weight of each pixel in the background depth-of-field images with the plurality of exposure values, to generate a high dynamic range image.

In this embodiment of this application, for an execution process of this step, refer to step 212.

In this embodiment of this application, compared with the conventional technology, in the technical solutions used in embodiments of this application, each face depth of field is determined to obtain a foreground depth-of-field image corresponding to each face through synthesis, and each background depth of field is determined to obtain a background depth-of-field image corresponding to each background through synthesis, so that the depth of field is enhanced. In a photographing scenario, when a face is in focus and clear, there can be features of a clear foreground and a clear background, and a problem that a larger aperture leads to a shallower depth of field can be resolved, thereby effectively resolving a problem of blurring of a photographing background.

In the technical solutions provided in embodiments of this application, a plurality of images with different depths of field in a current photographing scene are obtained based on an HDR photographing operation entered by a user, and each image has an exposure value. A plurality of images with a same exposure value are synthesized to generate a full depth-of-field image. Full depth-of-field images with a plurality of exposure values are synthesized by using an HDR algorithm to generate a high dynamic range image. Therefore, a high dynamic range image that is clear at each depth of field can be obtained, and a problem that a shallow depth of field leads to a blurred background and an insufficient dynamic range, and then results in overexposure or underexposure of a high dynamic range image can be resolved.

Figure 14:
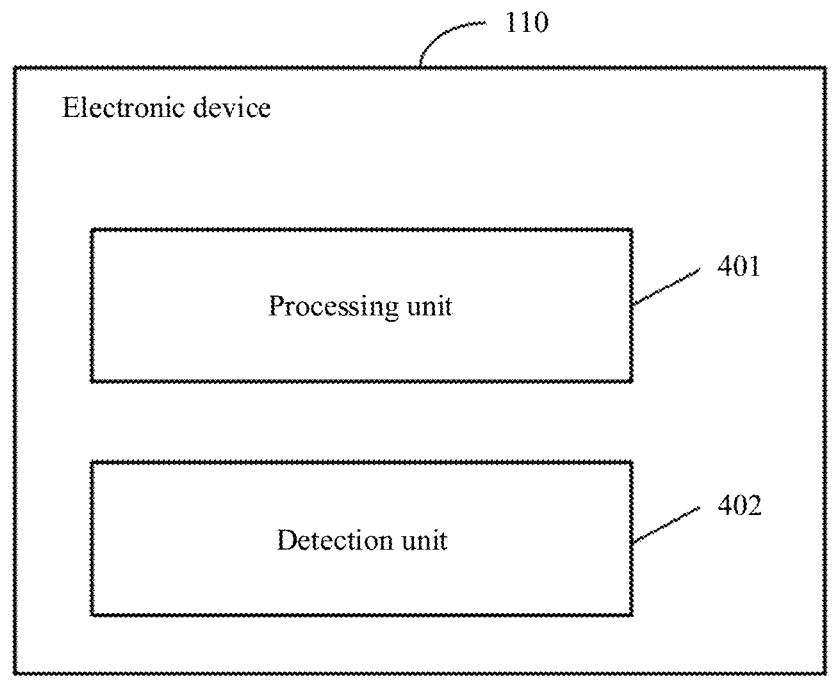
FIG. 14 is a schematic diagram of a structure of an electronic device according to an embodiment of this application.

FIG. 14 is a schematic diagram of a structure of an electronic device according to an embodiment of this application. It should be understood that the electronic device 110 can perform steps in the foregoing high dynamic range image synthesis method. To avoid repetition, details are not described herein again. The electronic device 110 includes a processing unit 401 and a detection unit 402.

The processing unit 401 is configured to obtain, based on an HDR photographing operation entered by a user, a plurality of images with different depths of field in a current photographing scene, where each image has an exposure value.

The processing unit 401 is further configured to synthesize a plurality of images with a same exposure value, to generate a full depth-of-field image.

The processing unit 401 is further configured to synthesize full depth-of-field images with a plurality of exposure values by using an HDR algorithm, to generate a high dynamic range image.

In a possible implementation, the processing unit 401 is further configured to obtain an initial foreground image from a plurality of images of the current photographing scene, and generating at least one foreground depth-of-field image based on the initial foreground image.

The processing unit 401 is further configured to obtain an initial background image from the plurality of images of the current photographing scene, and generating at least one background depth-of-field image based on the initial background image, where each foreground depth-of-field image has an exposure value and each background depth-of-field image has an exposure value.

In a possible implementation, the processing unit 401 is further configured to generate the full depth-of-field image based on a plurality of foreground depth-of-field images and a plurality of background depth-of-field images that have a same exposure value.

In a possible implementation, the processing unit 401 is further configured to calculate a synthesis weight of each pixel in the foreground depth-of-field image with the exposure value based on a pixel value corresponding to each pixel in the foreground depth-of-field image.

The processing unit 401 is further configured to calculate a synthesis weight of each pixel in the background depth-of-field image with the exposure value based on a pixel value corresponding to each pixel in the background depth-of-field image.

The processing unit 401 is further configured to synthesize obtained foreground depth-of-field images and background depth-of-field images with the plurality of exposure values based on a synthesis weight of each pixel in the foreground depth-of-field images with the plurality of exposure values and a synthesis weight of each pixel in the background depth-of-field images with the plurality of exposure values, to generate the high dynamic range image.

In a possible implementation, the detection unit 402 is configured to recognize a quantity of objects from the initial foreground image.

The processing unit 401 is further configured to: when the quantity of objects is greater than 1, determine first object depths of field corresponding to the plurality of objects.

The processing unit 401 is further configured to perform focusing on a plurality of objects with different first object depths of field, to obtain a plurality of first object focusing regions.

The processing unit 401 is further configured to generate a plurality of foreground depth-of-field images based on the initial foreground image, the plurality of first object focusing regions, the plurality of first object depths of field, and corresponding exposure values.

In a Possible Implementation,
the processing unit 401 is further configured to: when the quantity of objects is equal to 1, determine a second object depth of field corresponding to the object;
the processing unit 401 is further configured to perform focusing on the object with the second object depth of field, to obtain a second object focusing region; and
the processing unit 401 is further configured to generate one foreground depth-of-field image based on the initial foreground image, the second object focusing region, the second object depth of field, and a corresponding exposure value.

In a possible implementation, the detection unit 402 is further configured to detect whether contrast between the plurality of first object focusing regions is greater than a preset contrast value; and if it is detected that the contrast between the plurality of first object focusing regions is greater than the preset contrast value, continue to perform the step of performing focusing on a plurality of objects with different first object depths of field to obtain a plurality of first object focusing regions.

In a possible implementation, the object includes a face or a physical body.

In a possible implementation, the processing unit 401 is further configured to determine at least one background depth of field from the initial background image based on a preset depth-of-field range, where the background depth of field is greater than the first object depth of field or the second object depth of field.

The processing unit 401 is further configured to perform focusing on the at least one background depth of field, to obtain at least one background focusing region.

The processing unit 401 is further configured to generate the at least one background depth-of-field image based on the initial background image, the at least one background focusing region, the at least one background depth of field, and a corresponding exposure value. It should be understood that the electronic device 110 herein is embodied in a form of a function unit. The term "unit" herein may be implemented in a form of software and/or hardware. This is not specifically limited. For example, the "unit" may be a software program, a hardware circuit, or a combination thereof that implements the foregoing functions. The hardware circuit may include an application-specific integrated circuit (application-specific integrated circuit, ASIC), an electronic circuit, a memory and a processor (such as a shared processor, a dedicated processor, or a group of processors) configured to execute one or more software or firmware programs, a combined logic circuit, and/or another suitable component that supports the described function.

Therefore, the example units described in embodiments of this application can be implemented by using electronic hardware or a combination of computer software and electronic hardware. Whether the functions are implemented by hardware or software depends on specific applications and design constraints of the technical solutions. A person skilled in the art may use different methods for each specific application to implement the described functions, but this implementation should not be considered to be beyond the scope of this application.

An embodiment of this application further provides an electronic device. The electronic device may be a terminal device or a circuit device built into the terminal device. The device may be configured to perform the functions/steps in the foregoing method embodiments.

Figure 15:
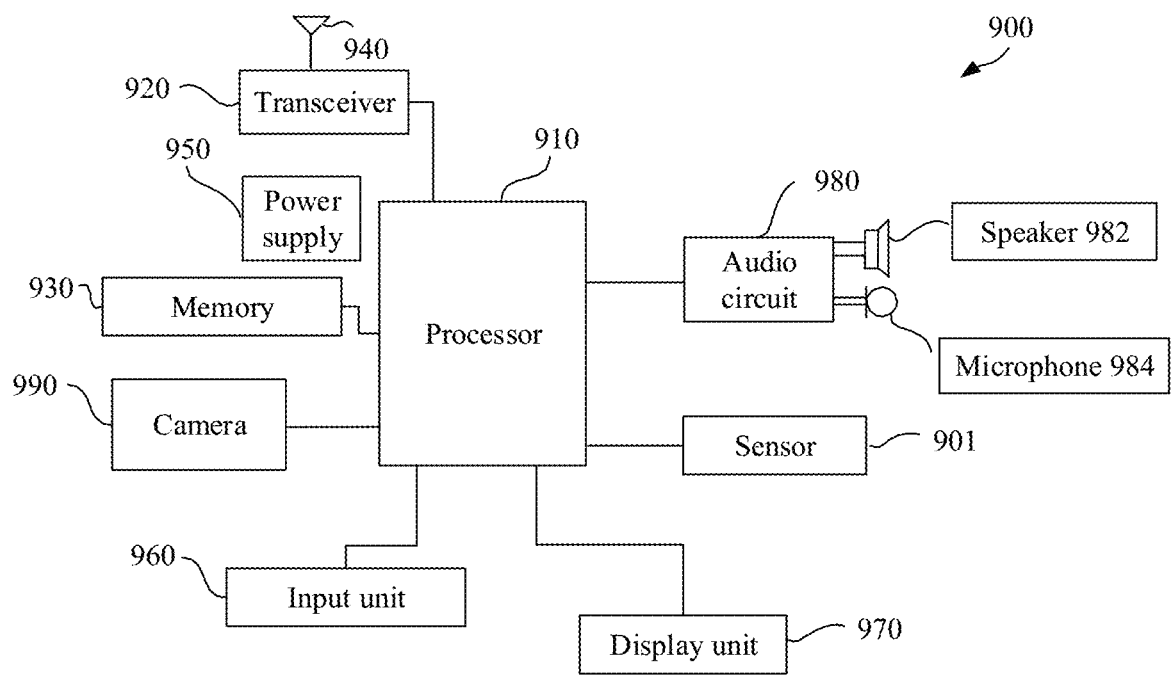
FIG. 15 is a schematic diagram of a structure of another electronic device according to an embodiment of this application.

FIG. 15 is a schematic diagram of a structure of another electronic device according to an embodiment of this application. As shown in FIG. 15, the electronic device 900 includes a processor 910 and a transceiver 920. Optionally, the electronic device 900 may further include a memory 930. The processor 910, the transceiver 920, and the memory 930 may communicate with each other by using an internal connection path, to transmit a control and/or data signal. The memory 930 is configured to store a computer program, and the processor 910 is configured to invoke the computer program from the memory 930 and run the computer program.

Optionally, the electronic device 900 may further include an antenna 940, configured to send a radio signal that is output by the transceiver 920.

The processor 910 and the memory 930 may be combined into one processing apparatus, or more commonly, are independent components. The processor 910 is configured to execute program code stored in the memory 930 to implement the foregoing functions. During specific implementation, the memory 930 may be integrated into the processor 910, or is independent of the processor 910. The processor 910 may be corresponding to the processing unit 401 in the device 100 in FIG. 14.

In addition, to improve a function of the electronic device 900, the electronic device 900 may further include one or more of an input unit 960, a display unit 970, an audio circuit 980, a camera 990, a sensor 901, and the like. The audio circuit may further include a speaker 982, a microphone 984, and the like. The display unit 970 may include a display.

Optionally, the electronic device 900 may further include a power supply 950, configured to supply power to various components or circuits in the terminal device.

It should be understood that the electronic device 900 shown in FIG. 15 can implement processes in the embodiments of the high dynamic range image synthesis methods shown in FIG. 6, FIG. 7a, FIG. 7b, FIG. 13a, and FIG. 13b. Operations and/or functions of modules in the electronic device 900 are used to implement corresponding procedures in the foregoing method embodiments. For details, refer to the description in the foregoing method embodiments. To avoid repetition, detailed description is appropriately omitted herein.

It should be understood that the processor 910 in the electronic device 900 shown in FIG. may be a system on a chip (system on a chip, SOC). The processor 910 may include a central processing unit (central processing unit, CPU), and may further include another type of processor. The CPU may be referred to as a host CPU. Processors work together to implement the foregoing method procedure, and each processor may selectively execute some software drive programs.

In conclusion, processors or processing units in the processor 910 may cooperate to implement the foregoing method procedure, and a corresponding software program of each processor or processing unit may be stored in the memory 930.

This application further provides a computer-readable storage medium. The computer-readable storage medium stores instructions. When the instructions are run on a computer, the computer is enabled to perform steps in the high dynamic range image synthesis methods shown in FIG. 6, FIG. 7a, FIG. 7b, FIG. 13a, and FIG. 13b.

In the foregoing embodiments, the processor 910 may include, for example, a central processing unit (central processing unit, CPU), a microprocessor, a microcontroller, or a digital signal processor, and may further include a GPU, an NPU, and an ISP. The processor may further include a necessary hardware accelerator or logic processing hardware circuit, such as an application-specific integrated circuit (application-specific integrated circuit, ASIC), or one or more integrated circuits configured to control program execution in the technical solutions in this application. In addition, the processor may have a function of operating one or more software programs, and the software programs may be stored in the memory.

The memory may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disk storage, an optical disc storage (including a compressed optical disc, a laser disc, an optical disc, a digital versatile disc, a Blu-ray disc, or the like), a magnetic disk storage medium, or another magnetic storage device, or may be any other medium that can be used to carry or store expected program code in a form of an instruction or a data structure and that can be accessed by a computer.

In embodiments of this application, "at least one" refers to one or more, and "a plurality of" refers to two or more. The term "and/or" describes an association relationship of associated objects, and indicates that three relationships may exist. For example, A and/or B may indicate the following three cases: Only A exists, both A and B exist, and only B exists. A and B may be singular or plural. In addition, the character "/" usually indicates an "or" relationship between the associated objects. "At least one of the following terms" and similar expressions means any combination of these terms, including any combination of individual or complex terms." For example, at least one of a, b, and c may represent a, b, c, a-b, a-c, b-c, or a-b-c, where a, b, and c may be a single or multiple.

A person of ordinary skill in the art may be aware that the units and algorithm steps described in embodiments disclosed in this specification can be implemented by electronic hardware or a combination of computer software and electronic hardware. Whether the functions are implemented by hardware or software depends on specific applications and design constraints of the technical solutions. A person skilled in the art may use different methods for each specific application to implement the described functions, but this implementation should not be considered to be beyond the scope of this application.

It may be clearly understood by a person skilled in the art that, for convenience and brevity of description, for a specific working process of the foregoing described system, apparatus, and unit, refer to a corresponding process in the foregoing method embodiments, and details are not described herein again.

In the several embodiments provided in this application, any function that is implemented in a form of a software function unit and sold or used as an independent product may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, and any change or replacement readily figured out by a person skilled in the art within the technical scope disclosed in this application shall fall within the protection scope of this application. The protection scope of this application shall be subject to the protection scope of the claims.

What is claimed is:

1. A high dynamic range image synthesis method, wherein the method comprises:
obtaining, based on a high dynamic range (HDR) photographing operation, a plurality of images with different depths of field in a current photographing scene, including generating at least one foreground depth-of-field image based on an initial foreground image from the plurality of images, and generating at least one background depth-of-field image based on an initial background image from the plurality of images, wherein each of the plurality of images, and each of the at least one foreground depth-of-field image, and each of the at least one background depth-of-field image has a respective exposure value;
generating full depth of field images, including, for each of the full depth of field images, synthesizing those of the plurality of images that have a same exposure value, to generate a respective one of the full depth-of-field images; and synthesizing the full depth-of-field images with a plurality of exposure values by using an HDR algorithm, to generate a high dynamic range image.

2. The method according to claim 1, wherein the initial foreground image includes a plurality of objects and the initial background image is obtained by having the plurality of objects cut out.

3. The method according to claim 1, wherein the synthesizing the plurality of images with the same exposure value, to generate a respective one of the full depth-of-field images comprises:

generating the respective one of the full depth-of-field images based on synthesizing those of the at least one foreground depth-of-field image and those of the at least one background depth-of-field image that have the same exposure value.

4. The method according to claim 3, wherein the synthesizing the full depth-of-field images with the plurality of exposure values by using the HDR algorithm comprises:

calculating a synthesis weight of each pixel in the at least one foreground depth-of-field image with one of the plurality of exposure values based on a pixel value corresponding to each pixel in the at least one foreground depth-of-field image;

calculating a synthesis weight of each pixel in the at least one background depth-of-field image with the one of the plurality of exposure values based on a pixel value corresponding to each pixel in the at least one background depth-of-field image; and synthesizing the at least one foreground depth-of-field image and the at least one background depth-of-field image with the plurality of exposure values based on the synthesis weight of each pixel in the at least one foreground depth-of-field images with the plurality of exposure values and the synthesis weight of each pixel in the at least one background depth-of-field images with the plurality of exposure values, to generate the high dynamic range image.

5. The method according to claim 1, wherein the at least one foreground depth-of-field image comprises a plurality of foreground depth-of-field images, and generating the plurality of foreground depth-of-field images comprises:

recognizing that a quantity of objects from the initial foreground image is greater than 1, and, in response, determining first object depths of field corresponding to the plurality of objects;

performing focusing on a plurality of objects with different first object depths of field, to obtain a plurality of first object focusing regions; and generating the plurality of foreground depth-of-field images based on the initial foreground image, the plurality of first object focusing regions, the first object depths of field, and corresponding exposure values.

6. The method according to claim 5, wherein the method further comprises:

in response to recognizing that the quantity of objects from the initial foreground image equal to 1, determining a second object depth of field corresponding to the single object;

performing focusing on the single object with the second object depth of field, to obtain a second object focusing region; and generating one foreground depth-of-field image based on the initial foreground image, the second object focusing region, the second object depth of field, and a corresponding exposure value.

7. The method according to claim 5, wherein before the generating the plurality of foreground depth-of-field images, the method further comprises:

detecting whether contrast between the plurality of first object focusing regions is greater than a preset contrast value; and if it is detected that the contrast between the plurality of first object focusing regions is greater than the preset contrast value, continuing to focus on the plurality of objects with different first object depths of field to obtain the plurality of first object focusing regions.

8. The method according to claim 5, wherein the object comprises a face or a physical body.

9. The method according to claim 6, wherein the generating the at least one background depth-of-field image based on the initial background image comprises:

determining the at least one background depth of field from the initial background image based on a preset depth-of-field range, wherein the at least one background depth of field is greater than the first object depth of field or the second object depth of field;

performing focusing on the at least one background depth of field, to obtain at least one background focusing region; and generating the at least one background depth-of-field image based on the initial background image, the at least one background focusing region, the at least one background depth of field, and a corresponding exposure value.

10. An electronic device, comprising:

a display; a camera; one or more processors; a memory; a plurality of application programs; and one or more computer programs, wherein the one or more computer programs are stored in the memory, the one or more computer programs comprise instructions, and when the instructions are executed by the device, the device is enabled to perform the following steps:

obtaining, based on a high dynamic range (HDR) photographing operation, a plurality of images with different depths of field in a current photographing scene, including generating at least one foreground depth-of-field image based on an initial foreground image from the plurality of images, and generating at least one background depth-of-field image based on an initial background image from the plurality images, wherein each of the plurality of images, and each of the at least one foreground depth-of-field image, and each of the at least one background depth-of-field image has a respective exposure value;

generating full depth of field images, including, for each of the full depth of field images, synthesizing those of the plurality of images that have a same exposure value, to generate a respective one of the full depth-of-field images; and synthesizing the full depth-of-field images with a plurality of exposure values by using an HDR algorithm, to generate a high dynamic range image.

11. The device according to claim 10, wherein the initial foreground image includes a plurality of objects, and the initial background image is obtained by having the plurality of objects cut out.

12. The device according to claim 10, wherein the synthesizing the plurality of images with the same exposure value, to generate a respective one of the full depth-of-field images comprises:

generating the respective one of the full depth-of-field images based on synthesizing those of the at least one foreground depth-of-field image and those of the at least one background depth-of-field image that have the same exposure value.

13. The device according to claim 12, wherein the synthesizing the full depth-of-field images with the plurality of exposure values by using the HDR algorithm comprises:
   calculating a synthesis weight of each pixel in the at least one foreground depth-of-field image with one of the plurality of exposure values based on a pixel value corresponding to each pixel in the foreground depth-of-field image;
   calculating a synthesis weight of each pixel in the background depth-of-field image with the one of the exposure values based on a pixel value corresponding to each pixel in the background depth-of-field image; and
   synthesizing obtained foreground depth-of-field images and background depth-of-field images with the plurality of exposure values based on the synthesis weight of each pixel in the at least one foreground depth-of-field images with the plurality of exposure values and the synthesis weight of each pixel in the at least one background depth-of-field images with the plurality of exposure values, to generate the high dynamic range image.

14. The device according to claim 10, wherein the at least one foreground depth-of-field image comprises a plurality of foreground depth-of-field images, and generating the plurality of foreground depth-of-field images, and comprises:
   recognizing that a quantity of objects from the initial foreground image is greater than 1, and, in response, determining first object depths of field corresponding to the plurality of objects;
   performing focusing on a plurality of objects with different first object depths of field, to obtain a plurality of first object focusing regions; and
   generating the plurality of foreground depth-of-field images based on the initial foreground image, the plurality of first object focusing regions, the first object depths of field, and corresponding exposure values.

15. The device according to claim 14, wherein the device is further enabled to perform the following steps:
   in response to recognizing that the quantity of objects from the initial foreground image is equal to 1, determining a second object depth of field corresponding to the single object;
   performing focusing on the single object with the second object depth of field, to obtain a second object focusing region; and
   generating one foreground depth-of-field image based on the initial foreground image, the second object focusing region, the second object depth of field, and a corresponding exposure value.

16. The device according to claim 14, wherein prior to the generating the plurality of foreground depth-of-field images the device is further enabled to perform the following steps:
   detecting whether contrast between the plurality of first object focusing regions is greater than a preset contrast value; and
   if it is detected that the contrast between the plurality of first object focusing regions is greater than the preset contrast value, continuing to focus on the plurality of objects with different first object depths of field to obtain the plurality of first object focusing regions.

17. The device according to claim 14, wherein the object comprises a face or a physical body.

18. The device according to claim 15, wherein the generating the at least one background depth-of-field image based on the initial background image comprises:
   determining the at least one background depth of field from the initial background image based on a preset depth-of-field range, wherein the at least one background depth of field is greater than the first object depth of field or the second object depth of field;
   performing focusing on the at least one background depth of field, to obtain at least one background focusing region; and
   generating the at least one background depth-of-field image based on the initial background image, the at least one background focusing region, the at least one background depth of field, and a corresponding exposure value.

19. A nontransitory computer-readable storage medium, comprising computer instructions, wherein when the computer instructions are run on an electronic device, the electronic device is enabled to perform the following:
   obtaining, based on a high dynamic range (HDR) photographing operation, a plurality of images with different depths of field in a current photographing scene, including generating at least one foreground depth-of-field image based on an initial foreground image from the plurality of images, and generating at least one background depth-of-field image based on an initial background image from the plurality of images, wherein each of the plurality of images, and each of the at least one foreground depth-of-field image, and each of the at least one background depth-of-field image has a respective exposure value;
   generating full depth of field images, including, for each of the full depth of field images, synthesizing those of the plurality of images that have a same exposure value, to generate a respective one of the full depth-of-field images; and
   synthesizing the full depth-of-field images with a plurality of exposure values by using an HDR algorithm, to generate a high dynamic range image.

20. The nontransitory computer-readable storage medium according to claim 19, wherein the initial foreground image includes a plurality of objects and the initial background image is obtained by having the plurality of objects cut out.

* * * * *

UNITED STATES PATENT AND TRADEMARK OFFICE
CERTIFICATE OF CORRECTION

PATENT NO. : 11,871,123 B2
APPLICATION NO. : 17/778195
DATED : January 9, 2024
INVENTOR(S) : Yu Zhang It is certified that error appears in the above-identified patent and that said Letters Patent is hereby corrected as shown below:

In the Claims

Column 35, Claim 6, Line 58, delete "image equal to one" and insert --image is equal to one--.

Column 36, Claim 10, Line 45, delete "plurality images" and insert --plurality of images--.

Column 37, Claim 14, Line 28, delete "depth-of-field images, and comprises:" and insert --depth-of-field images comprises:--.

Signed and Sealed this
Thirteenth Day of May, 2025

Coke Morgan Stewart
*Acting Director of the United States Patent and Trademark Office*